US006965645B2

(12) United States Patent
Zhang et al.

(10) Patent No.: US 6,965,645 B2
(45) Date of Patent: Nov. 15, 2005

(54) CONTENT-BASED CHARACTERIZATION OF VIDEO FRAME SEQUENCES

(75) Inventors: Hong-Jiang Zhang, Beijing (CN); Yufei Ma, Beijing (CN)

(73) Assignee: Microsoft Corporation, Redmond, WA (US)

( * ) Notice: Subject to any disclaimer, the term of this patent is extended or adjusted under 35 U.S.C. 154(b) by 777 days.

(21) Appl. No.: 09/963,164

(22) Filed: Sep. 25, 2001

(65) Prior Publication Data

US 2003/0086496 A1 May 8, 2003

(51) Int. Cl.⁷ ................................................ H04B 1/66
(52) U.S. Cl. ................................................ 375/240.16
(58) Field of Search ..................... 375/240.16, 240.01, 375/240.09, 240.05, 240.03, 240.15; 345/723; 382/224, 232; 209/247; H04B 1/66

(56) References Cited

U.S. PATENT DOCUMENTS

| | | | | |
|---|---|---|---|---|
| 5,764,921 A | * | 6/1998 | Banham et al. ............. 709/247 |
| 6,041,078 A | * | 3/2000 | Rao ....................... 375/240.16 |
| 6,058,210 A | * | 5/2000 | de Queiroz et al. ........ 382/232 |
| 6,597,738 B1 | * | 7/2003 | Park et al. .............. 375/240.16 |
| 6,628,715 B1 | * | 9/2003 | Iu et al. ................. 375/240.16 |
| 6,642,940 B1 | * | 11/2003 | Dakss et al. ................. 345/723 |
| 6,748,158 B1 | * | 6/2004 | Jasinschi et al. .............. 386/69 |
| 6,751,354 B2 | * | 6/2004 | Foote et al. ................. 382/224 |

\* cited by examiner

*Primary Examiner*—Tung Vo
(74) *Attorney, Agent, or Firm*—Lyon & Harr, LLP; Richard T. Lyon

(57) ABSTRACT

A system and process for video characterization that facilitates video classification and retrieval, as well as motion detection, applications. This involves characterizing a video sequence with a gray scale image having pixel levels that reflect the intensity of motion associated with a corresponding region in the sequence of video frames. The intensity of motion is defined using any of three characterizing processes. Namely, a perceived motion energy spectrum (PMES) characterizing process that represents object-based motion intensity over the sequence of frames, a spatio-temporal entropy (STE) characterizing process that represents the intensity of motion based on color variation at each pixel location, a motion vector angle entropy (MVAE) characterizing process which represents the intensity of motion based on the variation of motion vector angles.

35 Claims, 24 Drawing Sheets

(1 of 24 Drawing Sheet(s) Filed in Color)

| Query | NG (q) | NMRR (*MixEn*) | NMRR (*PMES*) |
|---|---|---|---|
| Pure panning | 8 | 0.582268 | 0.055802 |
| Panning with small active objects | 15 | 0.406667 | 0.042698 |
| Tracking (1) | 16 | 0.367767 | 0.050816 |
| Tracking (2) | 16 | 0.498980 | 0.041633 |
| Tracking (3) | 16 | 0.353061 | 0.064629 |
| Zooming with intensive object | 10 | 0.226296 | 0.064815 |
| Pure zooming | 6 | 0.200278 | 0.250926 |
| Slight motion (Anchorperson) | 12 | 0.129444 | 0.097037 |
| ANMRR | | 0.345595 | 0.083545 |

FIG. 18

CONTENT-BASED CHARACTERIZATION OF VIDEO FRAME SEQUENCES

BACKGROUND

1. Technical Field

The invention is related to characterizing video frame sequences, and more particularly to a system and process for characterizing a video shot with one or more gray scale images each having pixels that reflect the intensity of motion associated with a corresponding region in a sequence of frames of the video shot.

2. Background Art

In recent years, many different methods have been proposed for characterizing video to facilitate such applications as content-based video classification and retrieval in large video databases. For example, key-frame based characterization methods have been widely used. In these techniques, a representative frame is chosen to represent an entire shot. This approach has limitations though as a single frame cannot generally convey the temporal aspects of the video. Another popular video characterization method involves the use of pixel color, such as in so-called Group of Frame (GoF) or Group of Pictures (GoP) histogram techniques. However, while some temporal information is captured by these methods, the spatial aspects of the video are lost.

One of the best approaches to video characterization involves harnessing the characteristics of motion. However, it is difficult to use motion information effectively, since this data is hidden behind temporal variances of other visual features, such as color, shape and texture. In addition, the complexity of describing motion in video is compounded by the fact that it is a mixture of camera and object motions. Thus, in order to use motion as the basis for video characterization, it is necessary to extract motion information from the original frame sequence, and put it into an explicit format that can be operated on readily.

There are several approaches currently used for the representation of motion in video. The primary approach is motion estimation in which either a dense flow field is computed at the pixel level, or motion model parameters are derived. The latter can be used as a motion representation for further motion analysis. However, that approach is often limited to describing the consistent motion or global motion only. The former is a transform format of a real video frame, which can be used directly for motion-based video retrieval. However, many of the attributes of the optical flow field are not fully utilized owing to the lack of an effective and compact representation.

Another approach involves object based techniques, such as object segmentation and tracking, or motion layer extraction. These techniques allowed moving objects and their motion trajectories to be extracted and used to describe the motion in a video sequence. However, the semantic objects cannot always be identified easily in these techniques, making their practical application problematic.

Yet another approach to characterizing video sequences using motion takes advantage of temporal slices of an image volume to extract motion information. Although the temporal slices encode rich motion clues suitable for many applications, there are often many feigned visual patterns that confuse the motion analysis. In addition, the placement and orientation of the slices to capture the salient motion patterns is an intractable problem. Moreover, the computational complexity of the slice-based approach is high, and its results are often not reliable.

The development of MPEG video compression has brought with it various video characterizing methods using the motion vector field (MVF) that is computed as part of the video encoding process. In particular, these methods are used in conjunction with video indexing. For example, a so-called dominant motion method has been adopted in many video retrieval systems. However, this method does not provide sufficient motion information, since it computes only a coarse description of motion intensity and direction between frames owing to the fact that MVF is not a compact representation of motion. Moreover, it is impossible to discriminate the object motion from camera motion in the dominant motion method. In a related method, the parametric global motion estimation was used to extract object motion from background by neutralizing global motion. However, this extraction process is not always accurate and is processor intensive.

Some existing methods characterize video based on camera motion. In these methods, qualitative descriptions about camera motion models, such as panning, tracking, zooming, are used as motion features for video retrieval. However, although the camera motion is useful for filmmakers or other professional users, it is typically meaningless to the general users.

In addition to the need for video characterization in video retrieval type applications, such characterization is also useful in motion detection applications, such as surveillance and traffic monitoring. The simplest method of motion detection is based on characterizing the differences between frames. For example, the differences in pixels, edges and frame regions have been employed for this purpose. However, computing of differences between frames of a video is susceptible to noise. Dense flow field characterization methods have also been employed in motion detection applications. These methods are generally more reliable than difference-based methods. However, they cannot be used in real-time due to their computational complexity. Some learning-based approaches have also been proposed for motion detection. These methods involve a learned intensity probability distribution at each pixel which is less susceptible to noise. However, it is difficult to describe motion with just one probability distribution model, since motion in video is very complex and diverse. The previously mentioned temporal slice characterizations methods have also been employed in motion detection applications. For example, one such method constructs "XT" or "YT" spatio-temporal slices for detecting motions. Although these approaches are able to detect some specific motion patterns, it is difficult to select suitable slice positions and orientations because a slice only presents a part of motion information.

SUMMARY

The present invention is directed toward a system and process for video characterization that overcomes the problems associated with current methods, and which facilitates video classification and retrieval, as well as motion detection applications. In general, this involves characterizing a video sequence with a gray scale image having pixels that reflect the intensity of motion associated with a corresponding region in the sequence of video frames. The intensity of motion is defined using any of three characterizing processes. The first characterizing process produces a gray level image that is referred to as a perceived motion energy spectrum (PMES) image. The gray levels of the pixels of a PMES image represent the intensity of object-based motion over a sequence of frames. The second characterizing process produces a gray level image that is referred to as a spatio-temporal entropy (STE) image. The gray levels of the pixels of a STE image represents the intensity of motion over a sequence of frames based on color variation at each pixel location. The third characterizing process produces a gray level image that is referred to as a motion vector angle entropy (MVAE) image. The gray levels of the pixels of this image represent the intensity of motion based on the variation of motion vector angles.

In regard to PMES images, these images characterize a sequence of video frames by capturing both the spatial and temporal aspects of the motion of objects in the video sequence. This is essentially done by deriving motion energy information from motion vectors that describe the motion between frames of the video sequence. If the video is MPEG encoded as is often the case, the task of obtaining the motion vectors is facilitated as the P and B frames associated with a MPEG encoded video include the motion vector information. Specifically, each P or B frame of an MPEG encoded video contains motion vectors describing the motion of each of a series of macro blocks (i.e., typically a 16×16 pixel block). Thus, if the sequence it is desired to characterize with a PMES image is MPEG encoded, the motion vectors can be taken directly from the P and B frames of the video sequence. In such a case, the PMES image would reflect the macro block scale of the MPEG encoded frames. If the video is not MPEG encoded, and does not already contain motion vector information, then motion vectors must be derived from the frames of the video as a pre-processing step. Any conventional method can be employed to accomplish this task. The motion vectors derived from the video frame sequence can correspond to a macro block scale similar to an MPEG encoded video, or any scale desired down to pixel. Essentially, the present system and process for generating a PMES image can accommodate motion vectors corresponding to any scale. However, it will be assumed in the following description that a macro block scale applies.

Given that motion vector information is contained within at least some of the frames of a sequence it is desired to characterize as a PMES image, the image is generated by initially inputting the first frame of the sequence containing the motion vector information. In the case of MPEG encoded video, this would be the first P or B frame. A conventional MPEG parsing module can be employed to identify the desired frames. The motion vector information is then extracted from the frame. This information will describe the motion vector associated with each macro block of the frame, and is often referred to as the Motion Vector Field (MVF) of the frame.

The PMES image is essentially an accumulation of the object motion energy derived from the video sequence. However, extremely intense motion as represented by motion vectors having unusually large magnitudes can overwhelm the PMES image and mask the pertinent motion that it is desired to capture in the image. In order to mitigate the effects of motion vectors having a typically high magnitudes, a spatial filtering procedure is performed. This involves, for each macro block, identifying all the motion vectors associated with macro blocks contained within a prescribed-sized spatial filter window centered on the macro block under consideration. The identified motion vectors are sorted in descending order of magnitude, and the magnitude of the vector falling fourth from the top of the list is designated as the spatial filter threshold value. The magnitude of any identified motion vector remains unchanged if it is equal to or less than the threshold value. However, if the magnitude of one of the identified motion vectors exceeds the threshold value, then its magnitude is reset to equal the threshold value.

A concern in connection with the generation of a PMES image is the issue of overexposure. An overexposed condition occurs when the energy data derived from the frames of the sequence accumulates to the point that the generated PMES image becomes energy saturated. This means that any new energy data from a subsequent frame would not make much of a contribution to the image. Accordingly, the resulting PMES image would not capture the energy of the moving objects associated with the additional frames in a discernable and distinguishable way. As many of the applications that could employ a PMES image, such as video shot retrieval, rely on the image capturing the object motion characterized therein completely, overexposure would be detrimental. The aforementioned video shot is simply a sequence of frames of a video that have been recorded contiguously and which represent a continuous action in time or space. Similarly, if too little energy data is captured in the PMES image, the object motion represented by the image could be too incomplete to make it useful. As such, it is desirable to determine, with the addition of the energy data from each frame, whether a PMES image generated from the accumulated energy data would be properly exposed. Should proper exposure be achieved before all the frames of a shot have been characterized, then multiple PMES images can be generated to characterize the shot.

The determination as to whether a properly exposed PMES image would be generated with the addition of the energy data from the last inputted frame, is accomplished as follows in one embodiment of the present invention. First, the motion energy flux associated with the all the inputted frames up to and including the last inputted frame, is computed. This flux is used to represent the accumulated energy data. The motion energy flux is obtained by computing the product of a prescribed normalizing constant, a motion intensity coefficient, the area of a prescribed tracking window employed in the PMES generation process, and the number of frames input so far. The motion intensity coefficient is computed by first determining the average magnitude of the motion vectors of every macro block in each of the inputted frames. In addition, a value reflecting the average variation of the vector angle associated with the motion vectors of every macro block in each of the inputted frames is computed. The average magnitude value is multiplied by a first weighting factor and the average angle variation value is multiplied by a second weighting factor, and then the resulting products are summed. The first and second weighting factors are prescribed in view of the type of shot being characterized by the PMES image. For example, if the important aspect of the shot is that motion occurs, such as in a surveillance video, then the average magnitude component of the energy intensity coefficient is controlling and is weighted more heavily. If, however, the shot is of the type that inherently includes a lot of motion, such as a video of a sporting event, then the type of motion as represented by the variation in the motion vector angles may be of more importance than the magnitude of the motion. In that case, the average angle variation component is weighted more heavily.

Once the motion energy flux is computed, it is compared to a prescribed threshold flux that is indicative of a properly exposed PMES image. Specifically, it is determined whether the computed motion energy flux equals or exceed the flux threshold value. If it does not, then it is possible to include more motion energy data in the PMES being generated. To this end, another frame containing motion vector information is input and the process described above is repeated. However, when it is determined that the prescribed flux threshold has been met, it is time to generate the PMES image.

There is a possibility that all the frames of a shot would be processed before the desired motion energy flux threshold is met. While it is ideal that the threshold be met, an underexposed PMES image, especially one that may be just slightly underexposed, could still be of some use depending on the application. Accordingly, the PMES image should be generated even if there are not enough frames in the shot to meet the motion energy flux threshold.

The PMES image is generated by first computing a mixture energy value indicative of the energy associated with both object motion and camera motion in the inputted frames of the video sequence being characterized. This is essentially accomplished by applying a temporal energy filter to the previously, spatially-filtered motion vector magnitude values. Specifically, for each macro block location, the spatially filter magnitude values associated with motion vectors of macro blocks residing within a tracking volume defined by the aforementioned tracking window centered about the macro block under consideration and the sequence of inputted frames, are sorted in descending order. A prescribed number of the magnitude values falling at the high and low ends of the sorted list are then eliminated from the computation. The remaining magnitude values are averaged, and divided by the area of the tracking window and the number of accounted frames. If the averaged magnitude value divided by a prescribed truncating threshold is equal to or less than 1, the mixture energy for the macro block location under consideration is assigned a value equal to the averaged magnitude value divided by the truncating threshold. However, if the averaged magnitude value divided by the prescribed truncating threshold is greater than 1, the mixture energy is assigned a value of 1. It is noted that the mixture energy value is a normalized value as it will fall within a range between 0 and 1.

Once the normalized energy mixture value for the macro block under consideration has been computed, a global motion filtering operation is performed to extract the component of the mixture energy associated with camera motion, thereby leaving just the energy associated with object motion. This object-based motion energy is referred to as the perceived motion energy (PME) and is ultimately used to define the pixel values of the PMES image. The first part of the global motion filtering procedure is to compute a global motion ratio using a motion vector angle histogram approach. This is accomplished by identifying the number of vector angles associated with the motion vectors of macro blocks residing within the aforementioned tracking volume that fall into each of a prescribed number of angle range bins. The total number of motion vectors having angles falling into each bin is respectively divided by the sum of the number motion vectors having angles falling into all of the bins. This produces a normalized motion vector angle histogram that represents a probability distribution for the angles. The normalized motion vector angle histogram value associated with each bin is then respectively multiplied by the logarithm of that value, and the individual products are summed. The negative value of the result is then designated as the angle entropy value for the macro block location under consideration. The angle entropy value is divided by the logarithm of the total number of bins in the angle histogram to produce a normalized angle entropy. This normalized value represents the global motion ratio. The closer this ratio is to 0, the more the mixture energy is attributable to camera motion. Finally, the PME value for the macro block location under consideration is computed by multiplying the global motion ratio by the normalized mixture energy. The foregoing procedure is then repeated for each of the remaining macro block locations, thereby producing a PME value for each one.

The PME values are used to form the PMES image. This is accomplished by first quantizing the PME values to 256 gray levels to the create PME spectrum. The gray level corresponding to each PME value is then assigned to its associated macro block location to create the PMES image. In the PMES image, the lighter areas indicate higher object motion energy and the darker areas indicate lower object motion energy.

In regard to STE images, these images characterize a sequence of frames such as those forming a video shot by tracking the variation in the color at each pixel location over the sequence of frames making up the shot. The variation in color at a pixel location represents another form of motion energy that can be used to characterize a video sequence. A STE image is generated by initially inputting a frame of the shot. If the video is encoded as is often the case, the inputted frame is decoded to extract the pixel color information.

Since, like a PMES image, the STE image is an accumulation of the motion energy derived from a shot, overexposure and underexposure are a concern. The determination as to whether a properly exposed STE image would be generated with the addition of the energy data from the last inputted frame, is accomplished in much the same way as it was for a PMES image. For example, in one embodiment, the motion energy flux associated with the inputted frames up to and including the last inputted frame, is computed, and compared to a threshold flux. Specifically, the motion energy flux is obtained by computing the product of a prescribed normalizing constant, a motion intensity coefficient, the area of a prescribed tracking window employed in the STE image generation process, and the number of frames input so far. This is the same process used to compute the motion energy flux in PMES image generation. However, in this case of a STE image process, the motion intensity coefficient is computed differently. Essentially, the motion intensity coefficient is determined by computing a value reflecting the average variation of the color level for every pixel location in each of the inputted frames. This average color variation value is then multiplied by a normalizing factor, such as the reciprocal of the maximum color variation observed in the pixel color levels among every pixel in each of the inputted frames. Once motion energy flux is computed, it is compared to a prescribed threshold flux that is indicative of a properly exposed STE image. Specifically, it is determined whether the computed motion energy flux equals or exceeds the flux threshold value. If it does not, then it is possible to include more motion energy data in the STE being generated. To this end, another frame is input, decoded as needed, and the process described above to determine if the amount of color variation information from the inputted frames would produce a properly exposed STE images, is repeated. The STE image is generated when it is determined that the prescribed flux threshold has been met, or that there are no more frames in the shot to input.

The STE image is generated by first selecting a pixel location of the inputted frames. The number of pixels residing within a tracking volume whose pixel color levels fall into each of a prescribed number of color space range bins, is then identified. The tracking volume associated with a particular pixel location of the frames is defined by a tracking window centered about the pixel location under consideration and the sequence of inputted frames. The total number of pixels having color levels falling into each bin is respectively divided by the sum of the number pixels having color levels falling into all of the bins within the tracking volume, to produce a normalized temporal color histogram that represents a probability distribution for the color levels. The normalized temporal color histogram value associated with each bin is then multiplied by the logarithm of that value, and the individual products are summed. The negative value of the result is then designated as the STE value for the pixel location under consideration. This procedure is then repeated for each of the remaining pixel locations, thereby producing a STE value for each one.

Once STE values have been computed for each pixel location, a STE images is generated. This is accomplished in the same way as it was for a PMES image. Namely, the STE values are quantized to 256 gray levels, and the gray level corresponding to each STE value is assigned to its associated pixel location, to create the STE image. In a STE image, the lighter areas also indicate higher motion energy and the darker areas indicate lower motion energy.

It is noted that in the foregoing STE image generating process, the color space can be defined in any conventional way. For example, if the original shot is a MPEG encoded video, the decoded pixel color levels will be defined in terms of the conventional YUV color space. Thus, all the possible levels of each component of the color space would be divided into prescribed ranges, and the bins of the temporal color histogram will represent all the combinations of these ranges. It is further noted that shots having frames with pixels defined in gray scale rather than color could also be characterized using a STE image. The process would be the same except a temporal gray scale histogram would replace the temporal color histogram.

In regard to the MVAE images, these images characterize a video sequence such as a video shot using the motion vector angle entropy values by themselves. This is unlike a PMES image which uses these values to compute a camera-to-object motion ratio to extract the object motion energy (i.e., PME). Thus, a MVAE image is not as specific to object motion as is a PMES image. However, the motion vector angle entropy values still provide motion energy information that uniquely characterizes a video shot. A MVAE image is generated by first inputting a frame of the shot. Specifically, the next frame in the sequence of frames making up the shot that has yet to be processed and which contains motion vector information is input. The motion vector information is extracted from the input frame and the motion energy flux is computed. The flux is computed in the same way it was in the PMES image generation process and takes into account all the motion vector information of the frames input so far. It is then determined if the motion energy flux exceeds a prescribed flux threshold value, which can be different from that used in the PMES image process. If it does not exceed the threshold, more motion vector information can be added. To this end, it is first determined whether there are any remaining previously unprocessed frames of the shot containing motion vector information. If so, another frame is input and processed as described above. When either the threshold is exceeded or there are no more frames of the shot to process, the process continues with a MVAE value being computed for each unit frame location, which will be assumed to be a macro block for the purposes of this description. Specifically, for each macro block location of the frames, a motion vector angle histogram is created by assigning to each of a set of motion vector angle range bins, the number of macro blocks residing within the tracking volume defined by the tracking window centered on the macro block location under consideration and the sequence of inputted frames, which have motion vector angles falling into that bin. The motion vector angle histogram is normalized by respectively dividing the total number of macro blocks whose angles fall into each bin by the sum of the number of macro blocks whose angles fall into all the bins. Each normalized motion vector angle histogram bin value is then multiplied by the logarithm of that value, and the products are summed. The negative value of this sum is designated as the MVAE value for the macro block location. The MVAE image generation process concludes with the MVAE values being quantized to 256 gray levels and the gray level corresponding to each value being assigned to its associated macro block location to create the MVAE image.

In the foregoing PMES, STE and MVAE image generating processes, a decision was made as to whether the addition of the energy data associated with the last inputted frame of the shot would produce a properly exposed PMES image. If not, another frame was input if possible and processed. If a proper exposure could be achieved with the data associated with the last input frame, no more frames were input and the image was generated. However, in an alternate embodiment, the number of frames that would produce the desired exposure for the PMES, STE or MVAE image is decided upon ahead of time. In this case, the characterizing image generating process is modified to eliminating those actions associated with ascertaining the motion energy flux and the exposure level of the image being generated. Instead, the prescribed number of frames is simply input, and the characterizing image is generated as described above.

PMES, STE and MVAE images can be used for a variety of applications. For example, all three image types can be used, alone and in combination, for finding and retrieving video shots from a database of shots. In addition, STE images are particularly suited for use in motion detection applications, such as detecting motion within a scene in a surveillance video.

In regard to video shot retrieval applications, one way of accomplishing this task is to create a database of PMES, STE and/or MVAE images that characterize a variety of video shots. The database can include just one type of the characterizing images, or a combination of the types of images. In addition, a particular shot can be characterized in the database by just one image type or by more than one type. The images are assigned a pointer or link to a location where the shot represented by the image is stored. A user submits a query to find shots depicting a desired type of motion in one of two ways. First, the user can submit a sample shot that has been characterized using a PMES, STE or MVAE image, depending on the types of characterizing images contained in the database being searched. Alternately, the user could submit a sketch image that represents the type of motion it is desired to find. This sketch image would look like a PMES, STE or MVAE image, as the case may be, that has been generated to characterize a shot depicting the type of action the user desires to find. The sample characterizing image or sketch image constituting the user's query is compared to the images in the database to find one of more matches. The location of the shot that corresponds to the matching image or images is then reported to the user, or the shot is accessed automatically and provided to the user. The number of shots reported or provided to the user can be just a single shot representing the best match to the user's query, or a similarity threshold could be established and all (or a prescribed number of the database shots matching the query with a degree of similarity exceeding the threshold would be reported or provided.

The aforementioned matching process can be done in a variety of ways. For example, in a PMES based shot retrieval application, a user query PMES image and each of the PMES images in the database are segmented into m×n panes. A normalized energy histogram with m×n bins is then constructed for each image. Specifically, for each pane in a PMES image under consideration, the PMES values are averaged. An energy histogram is then created by assigning to each of the histogram bins, the number of averaged PMES values that fall into the PMES value range associated with that bin. The energy histogram is normalized by respectively dividing the total number of averaged PMES values falling into each bin by the sum of the number of such values falling into all the bins. A comparison is then made by computing a separate similarity value indicative of the degree of similarity between the PMES image input by the user and each of the PMES images of the database that it is desired to compare to the input image. The degree of similarity is computed by first identifying, and then summing, the smaller bin values of each corresponding bin of the energy histograms associated with the pair of PMES images being compared. Then, for each corresponding bin of the energy histograms, the larger of the two bin values is identified, and the maximum bin values are summed. The sum of the minimum bin values is divided by the sum of the maximum bin values to produce the aforementioned similarity value. The PMES image or images of the database that exceed a prescribed degree of similarity to the PMES image input by the user are reported to the user as described above.

Another method of comparing characterizing images for shot retrieval involving either PMES or MVAE images entails identifying regions of high energy representing the salient object motion in the images being compared. These regions will be referred to as Hot Blocks. The Hot Blocks can be found by simply identifying regions in the PMES or MVAE images having pixel gray level values exceeding a prescribed threshold level. A comparison between a PMES or MVAE image input as a user query and a PMES or MVAE image in the database is accomplished by finding the degree of similarity between their Hot Block patterns. The degree of similarity in this case is determined by comparing at least one of the size, shape, location, and energy distribution of the identified high energy regions between the pair of characterizing images being compared. Those comparisons that exhibit a degree of similarity exceeding a prescribed threshold are reported to the user as described above.

The aforementioned STE images can also be compared for shot retrieval purposes. A STE image depicts the motion of a shot in a manner in which the objects and background are discernable. Because of this conventional comparison techniques employed with normal images can be employed in a shot retrieval application using STE images. For example, the distinguishing features of a STE image can be extracted using a conventional gray scale or edge histogram (global or local), entropy, texture, and shape techniques, among others. The STE image submitted by a user is then compared to the STE images in the database and their degree of similarity accessed. The STE image or images in the database that exceed a prescribed degree of similarity to the STE image input by the user are reported or provided to the user as described above.

Comparison for shot retrieval purposes can also be accomplished using PMES, STE and MVAE images in a hierarchical manner. For example, the salient motion regions of a shot input by a user in a retrieval query can be characterized using either a PMES or MVAE image and then the hot blocks can be identified. This is followed with the characterization of just the hot block regions of the shot using a STE image. Finally, a database containing STE characterized shots would be searched as described above to find matching video sequences. Alternately, the database containing PMES or MVAE images could be searched and candidate match video shots identified in a preliminary screening. These candidate shots are then characterized as STE images (if such images do not already exist in the database), as is the user input shot. The STE image associated with the user input shot is then compared to the STE images associated with the candidate shots to identify the final shots that are reported or provided to the user.

It is noted that in the foregoing shot retrieval applications that require some pre-processing before characterizing images in the database can be compared to the user query image, the pre-processing can be performed ahead of time and the results stored in or made accessible to the database. For example, the segmenting and histogram pre-processing actions associated with the above-described PMES based shot retrieval application, can be performed before the user query is made. Likewise, the identification of hot blocks in PMES or MVAE images contained in the database can be preformed ahead of time.

In regard to using STE images as a basis for a motion detection process, one preferred process begins by filtering the a STE image generated from a video sequence in which it is desired to determine if motion has occurred to eliminate high frequency noise. The smoothed STE image is then subjected to a morphological filtering operation to consolidate regions of motion and to eliminate any extraneous region where the indication of motion is caused by noise. A standard region growing technique can then be used to establish the size of each motion region, and the position of each motion region can be identified using a boundary box.

It is noted that in many surveillance-type applications, it is required that the motion detection process be nearly real-time. This is possible using the present STE images based motion detection process, even though a STE image requires a number of frames to be processed to ensure proper exposure.

Essentially, a sliding window approach is employed where there is an initialization period in which a first STE image is generated from the initial frames of the video. Once the first STE image is generated, subsequent STE images can be generated by simply dropping the pixel data associated with the first frame of the previously considered frame sequence and adding the pixel data from the next received frame of the video.

DESCRIPTION OF THE DRAWINGS

The patent or application file contains at least one drawing executed in color. Copies of this patent or patent application publication with color drawing(s) will be provided by the Office upon request and payment of the necessary fee.

The specific features, aspects, and advantages of the present invention will become better understood with regard to the following description, appended claims, and accompanying drawings where:

FIG. 18 is a NMRR results table showing the retrieval rates of a shot retrieval application employing PMES images for 8 representative video shots.

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

Figure 1:
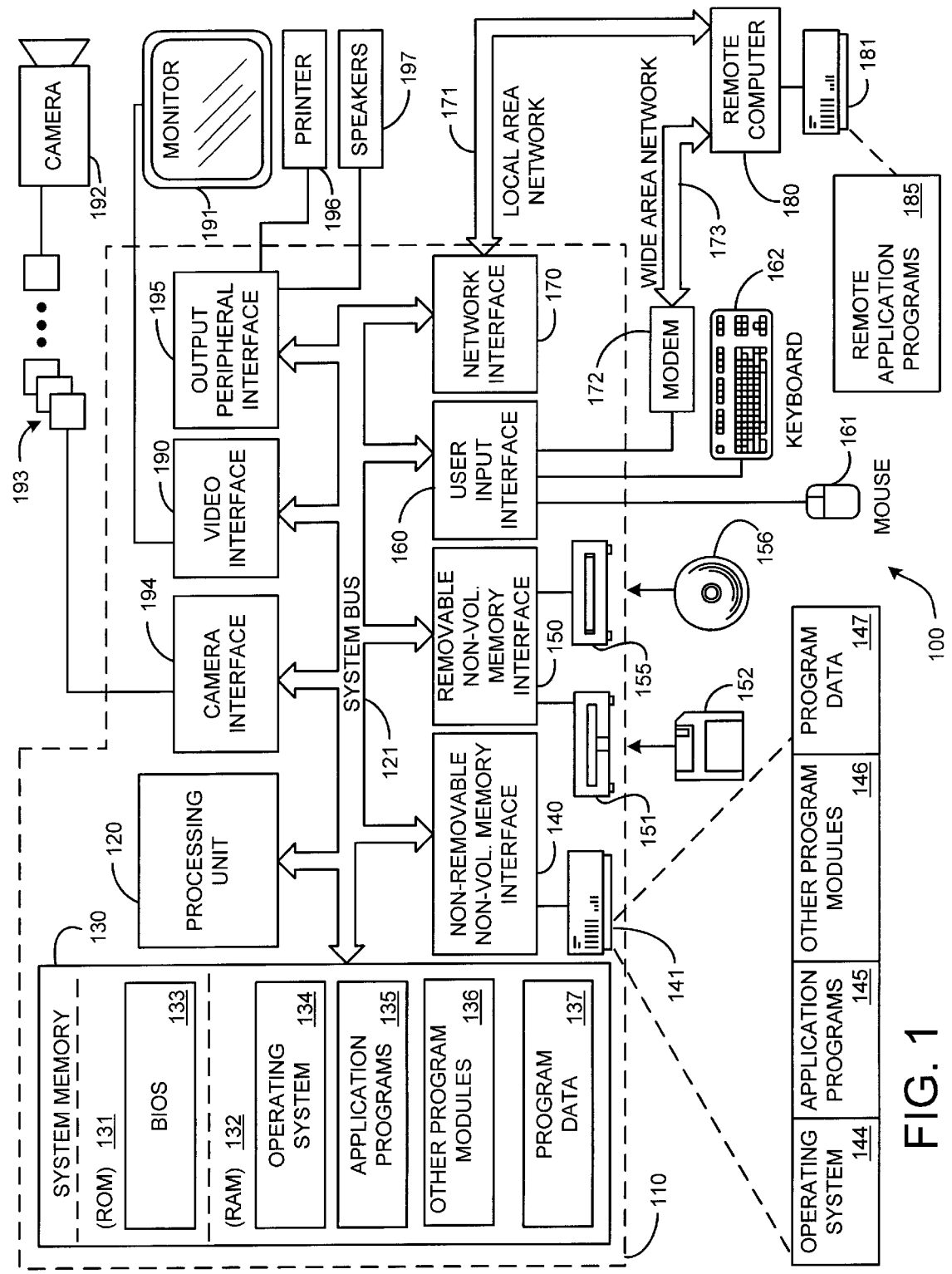
FIG. 1 is a diagram depicting a general purpose computing device constituting an exemplary system for implementing the present invention.

Before providing a description of the preferred embodiments of the present invention, a brief, general description of a suitable computing environment in which the invention may be implemented will be described. FIG. 1 illustrates an example of a suitable computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as input devices to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
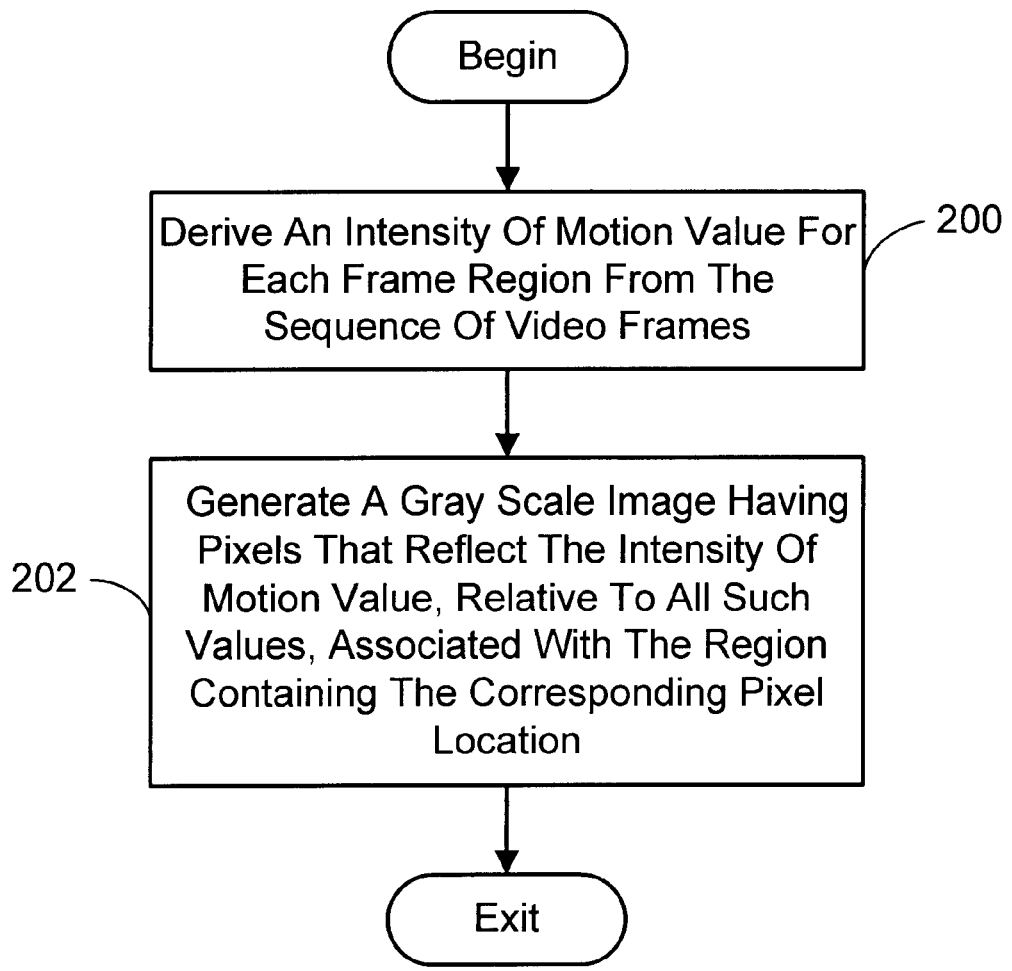
FIG. 2 is a flow chart diagramming an overall process for characterizing a sequence of video frames with a gray scale image having pixels that reflect the intensity of motion associated with a corresponding region in the frame sequence in accordance with the present invention.

The exemplary operating environment having now been discussed, the remaining part of this description section will be devoted to a description of the program modules embodying the invention. Generally, the system and process according to the present invention involves characterizing a sequence of video frames to facilitate their use in video classification and retrieval, as well as motion detection applications. In general, this is accomplished via the following process actions, as shown in the high-level flow diagram of FIG. 2:

a) deriving from the sequence of video frames a separate value indicative of the intensity of the motion depicted over the sequence in each of a plurality of frame regions (process action 200); and, b) generating a gray scale image having the same resolution as the video frames making up the sequence, where each pixel of the gray scale image has a gray scale level reflecting the value indicating the intensity of motion, relative to all such values, associated with the region containing the corresponding pixel location (process action 202).

The aforementioned intensity of motion is defined using any of three characterizing processes. Namely, a perceived motion energy spectrum (PMES) characterizing process that represents object-based motion intensity over the sequence of frames, a spatio-temporal entropy (STE) characterizing process that represents the intensity of motion based on color variation at each pixel location, and a motion vector angle entropy (MVAE) characterizing process which represents the intensity of motion based on the variation of motion vector angles. Each of these characterizing processes, as well as various applications in which the images are employed, will be described in detail in the sections to follow.

1. Perceived Motion Energy Spectrum (PMES) Characterization

Figure 3:
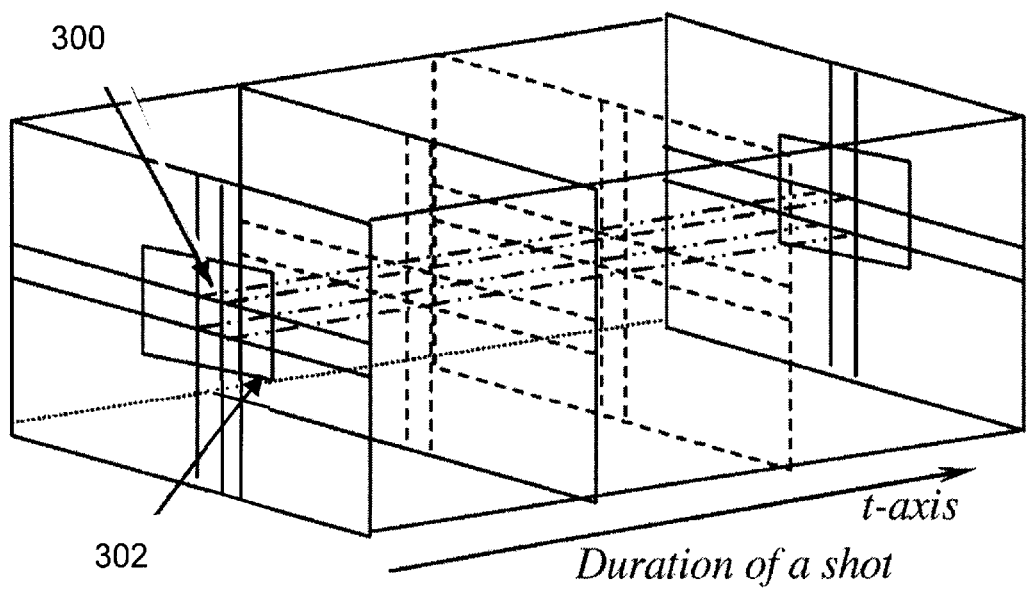
FIG. 3 is a graphical representation of a tracking volume defined by a filter window centered on a macro block location and the sequence of video frames.

In a MPEG data stream, there are one or two motion vectors included in each macro block of a P-frame or B-frame for motion compensation purposes. The motion vectors associated with all the macro blocks of P-frame or B-frame are often referred as the motion vector field (MVF) of the frame. Since the magnitude of a motion vector reflects the motion velocity of a macro block, it can be used to compute the energy of motion of a region or object at macro block scale if most of a typical samples are removed. For an object in a shot, the more intensive its motion is, and the longer its duration of appearance is, the easier it is perceived by a human. Referring to FIG. 3, the motion energy at each macro block position (i,j) 300 of the MVF can be represented by the average of the motion magnitude relative to a filter window 302 over the duration of a shot. In addition, although the angle of a motion vector is not reliable to represent motion direction, the spatio-temporal consistency of the motion vector angles reflects the intensity of global motion.

Given the foregoing characterizations of the motion vectors' magnitude and angle, it is possible to design a temporal energy filter to accumulate the energy along the temporal axis, and a global motion filter for extracting actual object motion energy. The result is a perceived motion energy spectrum (PMES) image. It is noted that in tested embodiments of the present invention only the MVFs in the P-frames of a shot were considered in order to reduce computation complexity. However, this need not be the case.

1.1. Temporal Energy Filter

The a typical samples in a MVF usually result in inaccurate energy accumulation, so the magnitudes of the motion vectors in the MVF are revised through a spatial filtering process before computing the PMES images.

Specifically, a modified median filter is used as the spatial filter. The elements in the filter's window at macro block $MB_{i,j}$ are denoted by $\Omega_{i,j}$, and the width of window is denoted by $W_s$. The filtered magnitude of a motion vector is computed by, $$Mag_{i,j} = \begin{cases} Mag_{i,j} & (\text{if } Mag_{i,j} \leq Max4th(Mag_k)) \\ Max4th(Mag_{i,j}) & (\text{if } Mag_{i,j} > Max4th(Mag_k)) \end{cases} \quad (1)$$

where ($k \in \Omega_{i,j}$), and the function $Max4th(Mag_k)$ is the fourth value in a descending sorted list of magnitude elements $\Omega_{i,j}$ in the filter window.

Next, the spatially filtered magnitudes computed above at each macro block position (i,j) are averaged in temporal energy filter. The temporal energy filter takes the form of an alpha-trimmed filter within a 3-D spatio-temporal tracking volume, with a spatial size of $W_t^2$ and a temporal duration of $L_t$. Specifically, all of the magnitudes of the motion vectors in the tracking volume are first sorted. The values at the extreme ends of the sorted list are then trimmed. The remaining motion vector magnitudes are averaged to form the mixture energy $MixEn_{i,j}$, which includes the energy of both object and camera motion. Thus, $$MixEn_{i,j} = \frac{1}{(M - 2 \cdot \lfloor \alpha M \rfloor) \cdot W_t^2 \cdot L_t} \sum_{m=\lfloor \alpha M \rfloor+1}^{M-\lfloor \alpha M \rfloor} Mag_{i,j}(m) \quad (2)$$

where M is the total number of motion vector magnitudes in the tracking volume, $\lfloor \alpha M \rfloor$ is equal to the largest integer not greater than aM, and $Mag_{i,j}(m)$ is the motion vector magnitude value in the sorted list of the tracking volume. The foregoing trimming parameter a is between or equal to 0 and 0.5, and controls the number of data samples excluded from the accumulating computation. In order to compute the motion energy spectrum, the mixture energy should be normalized into a range form 0 to 1, as defined by:

$$\overline{MixEn_{i,j}} = \begin{cases} MixEn_{i,j}/\tau & (\text{if } MixEn_{i,j}/\tau \leq 1) \\ 1 & (\text{if } MixEn_{i,j}/\tau > 1) \end{cases} \quad (3)$$

Since most of the motion vector magnitude values are all in a narrow range according to the motion estimation algorithm, a reasonable truncating threshold $\tau$ can be selected according to the encoded parameter in a MPEG data stream. For example, the truncating threshold can be set to equal about ⅔ times of the maximum magnitude of motion vector.

1.2. Global Motion Filter

To extract the actual object motion or perceived motion energy from the previously-computed mixture energy $\overline{MixEn_{i,j}}$, a global motion filter is employed. To accomplish this task, the motion vector angle value is considered a stochastic variable, and its probability distribution function is deemed to be computable. As such, the consistency of the angle of a motion vector in the tracking volume can be measured by entropy. The normalized entropy reflects the ratio of the camera motion to the object motion.

Fortunately, the probability distribution function of motion vector angle variation can be obtained from a normalized angle histogram. The possible motion vector angle values in $2\pi$ are quantized into n angle ranges. Then, the number of angles falling into each range is accumulated over the tracking volume at each macro block position (i,j) to form an angle histogram with n bins, denoted by $AH_{i,j}(t)$, where $t\in[1,n]$.

The probability distribution function p(t) is defined as:

$$p(t)=AH_{i,j}(t)/\Sigma_{k=1}^{n}AH_{i,j}(k) \quad (4)$$

where $AH_{ij}(k)$ is the motion vector angle histogram defined as follows:

$$AH_{i,j}(k) = \sum_{fr=1}^{l}\sum_{(i,j)\in w} A_{i,j}, \quad (5)$$

$$(A_{i,j} = 1, \text{ if } \varphi_{i,j} \in N_k; A_{i,j} = 0 \text{ otherwise}).$$

In Eq. (5), fr refers to the frame number in the shot sequence of those frames containing motion vector information, l refers to the total number of frames in the shot, w refers to the tracking window, φ refers to the motion vector angle and $N_k$ refers to a particular motion vector angle bin (i.e., angle range) within the total number of bins n.

Given Eq. (5), the motion vector angle entropy, denoted by $AngEn_{i,j}$, can be computed as:

$$AngEn_{i,j} = -\sum_{t=1}^{n} p(t)\log p(t) \quad (6)$$

where the value range of $AngEn_{i,j}$ is [0, log n]. When p(t)=1/n with $t\in[1,n]$, $AngEn_{i,j}$ will reach a maximum value of log n. The normalized angle entropy can be considered as a ratio of global motion, denoted by $GMR_{ij}$, $$GMR_{i,j}=AngEn_{i,j}/\log n \quad (7)$$

where $GMR_{i,j}\in[0, 1]$. When $GMR_{i,j}$ approaches 0, it implies the camera motion is dominant in the mixture energy $\overline{MixEn_{i,j}}$, whereas as $GMR_{i,j}$ approaches 1, it implies the object motion is dominant in the mixture energy $\overline{MixEn_{i,j}}$. Thus, the $GMR_{i,j}$ value can be used as the filter to extract the object motion energy from the mixture motion energy as will be described next.

1.3. Generating PMES Image

Using the global motion filter, the perceived motion energy is computed as follows:

$$PMES_{i,j}=GMR_{i,j}\times\overline{MixEn_{i,j}} \quad (8)$$

Figure 19A:
FIGS. 19A–O are images comparing the results of characterizing a set of 5 video shots with a mixture energy image and with a PMES image, where the first column shows key-frames of a video shot, the second column shows the associated mixture energy image, and the last column shows the PMES image.
Figure 19B:
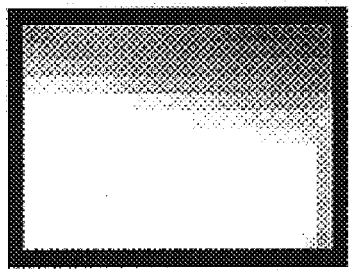
Figure 19C:
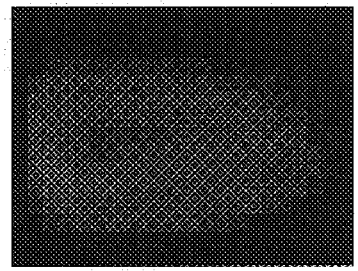

If all of the $PMES_{i,j}$ values at each macro block position are quantized to 256 levels of gray, a PMES image is generated. In a PMES image, light denotes high energy, and dark denotes low energy. Namely, the lighter the region in the image is, the more intensive the motion. FIGS. 19C, F, I, L, and O show some examples of PMES images.

It is noted that in the foregoing description, the generation of a PMES image assumed the frames of the video sequence under consideration where characterized in terms of a conventional macro block scheme, and that each motion vector was associated with a particular macro block. This characterization is convenient when dealing with MPEG data which is encoded in macro block scale and has motion vectors assigned to the macro blocks. However, the present invention is not intended to be limited to a macro block scheme. Rather, the foregoing PMES image generating process can be adapted to any handle any size pixel region, or even be performed on a pixel, as long as a motion vector can be extracted and assigned to each unit location.

2. Spatio-Temporal Entropy Characterization

The previously-mentioned dense flow is computed based on the gray level matching of pixels. Namely, the difference between two consecutive frames is considered in terms of a pixel's movement from a position in the current frame to another position in the next frame. However, it also can be considered as the state transition of a pixel location. For example, in a 256 level gray image, each pixel has 256 states. Over time, a pixel location's state typically changes from one gray level to another. The diversity of state transitions at each pixel location is indicative of the intensity of motion at that location. This is also true of color images where the color levels change at each pixel location over time.

The diversity of the state transitions can be observed in terms of a probability distribution of each pixel location's state along the temporal axis. For a color image sequence, a temporal color histogram is used to present state distribution. Then, the probability distribution function of a pixel's state is obtained by histogram normalization. In order to reflect the relationship between a pixel and its neighborhood, a rectangular spatial window is adopted, called the accumulating or tracking window. Specifically, the spatio-temporal color histogram is obtained by accumulating the number of pixels in the spatial window and along the temporal axis. For example, if a YUV color space representation of the pixel's state is employed, the spatio-temporal color histogram is denoted by $H_{i,j,t}^{w}(Y,U,V)$. In $H_{i,j,t}^{w}(Y,U,V)$, (i,j) denotes the position of the pixel, w is the tracking window size in that the window will cover an area of w×w pixels, and t is the duration of observation. Thus, the corresponding probability distribution function of each pixel can be computed by:

$$p_{i,j,t}^{w}(Y, U, V) = \frac{H_{i,j,t}^{w}(Y, U, V)}{\sum_{Y,U,V\in\Omega} H_{i,j,t}^{w}(Y, U, V)}, \quad (9)$$

where $$H_{i,j,t}^{w}(Y, U, V) = \sum_{fr=1}^{l}\sum_{(i,j)\in w} C_{i,j}, \text{ with} \quad (10)$$

$$(C_{i,j} = 1, \text{ if } Y_{i,j} \in N_Y,$$

$$U_{i,j} \in N_U, V_{i,j} \in N_V; C_{i,j} = 0 \text{ otherwise})$$

In Eq. (9), Ω is the quantization space of the YUV color space. If Y, U, V are all quantized into n levels, the total bins in histogram will be n×n×n, which is also the size of Ω. In Eq. (10), fr refers to the frame number in the shot sequence, l refers to the total number of frames in the shot, $Y_{i,j}$, $U_{i,j}$ and $V_{i,j}$ refer to the respective Y,U and V color space values at each pixel position, and $N_Y$, $N_U$ and $N_V$ refer to a respective color space bin (i.e., YUV range) within the total number of bins.

When a variable's probability distribution function is given, the entropy can be used as a measure of state consistency. Meanwhile, the entropy is also a representation of energy. Accordingly, the state transition energy of a pixel location can be defined as follows:

$$E_{i,j,t}^{w} = -\sum_{Y,U,V \in \Omega} p_{i,j,t}^{w}(Y, U, V) \log p_{i,j,t}^{w}(Y, U, V) \quad (11)$$

where $$E_{i,j,t}^{w}$$

is the spatio-temporal entropy. The spatio-temporal entropy ranges from 0 to log (n×n×n). When $$p_{i,j,t}^{w} = \frac{1}{(n \times n \times n)}, E_{i,j,t}^{w}$$

will reach its maximum value of log (n×n×n).

If the spatio-temporal entropy $$E_{i,j,t}^{w}$$

of a pixel is quantized into 256 gray levels, an energy image referred to as a spatio-temporal entropy (STE) image, is formed. In a STE image, the lighter the pixel is, the higher its energy, and the more intensive its motion.

Figure 4A:
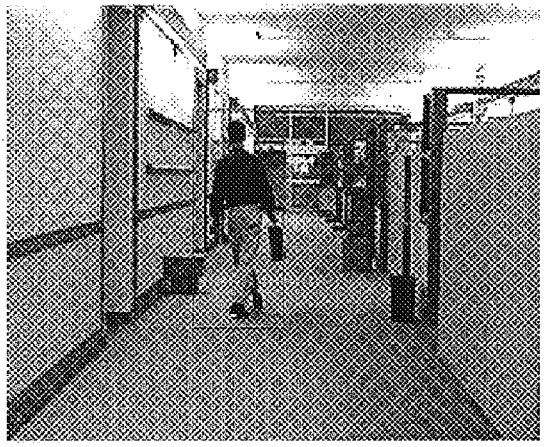
FIGS. 4A–D are images showing a frame chosen from a sequence of video frames (FIG. 4A), a frame-to-frame difference image (FIG. 4B), a binary image showing the region of motion associated with the sequence of frames (FIG. 4C), and a STE image derived from the frame sequence (FIG. 4D).
Figure 4B:
Figure 4C:
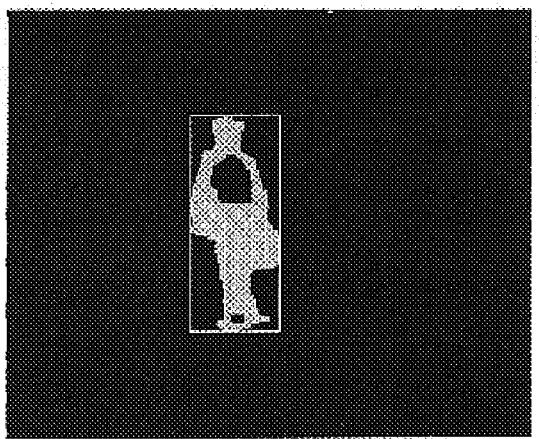
Figure 4D:

An example of an STE image is showed in FIG. 4D. This STE image was generated from a sequence of video frames depicting a person moving through a hallway. FIG. 4A is an example of one of the frames. As can be seen in the STE image depicted in FIG. 4D, the salient motion object, a walking man with a briefcase, can be identified clearly. Although the flickering of light results in some image noise, the object is still discernable. This is in part because of the fact that the noise cannot accumulated due to the statistical characteristics of a STE image.

It is noted that in the foregoing description, the color space was defined in terms of a conventional YUV scheme. This characterization of the color space is convenient when dealing with MPEG data which is encoded using the YUV scheme. However, the present invention is not intended to be limited to the YUV color space scheme. Rather, any convention color space characterization could be substituted. For example, in some applications of the present invention, the color space may be more conveniently characterized in terms of the conventional RGB scheme, such as when MPEG was not used to compress the video sequence under consideration. It is further noted that shots having frames with pixels defined in gray scale rather than color could also be characterized using a STE image. The process would be the same except a simplified temporal gray scale histogram would replace the temporal color histogram.

3. Motion Vector Angle Entropy Characterization

It was stated previously that although the angle of a motion vector is not reliable to represent motion direction, the spatio-temporal consistency of the motion vector angles reflects the intensity of global motion. In some applications, especially those where the camera motion is minimal, the global motion as defined by the motion vector angle entropy (MVAE), can also provide the basis for characterizing shots, just like the previously-described PMES and STE techniques. Thus, the spatio-temporal motion consistency at each unit frame location (which will be assumed to be a macro block for the following description) can be obtained by tracking the variation of the motion vector angle in a spatial window and along the temporal axis. In this case, the more consistent the motion vector angles are in a shot, the greater the intensity of the global motion. It is noted that the MVAE described here is equivalent to the previously-described motion vector angle entropy computed as part of the PMES image generation process and is obtained in the same way. Namely, a motion vector angle histogram $AH_{ij}(k)$ is defined as follows:

$$AH_{i,j}(k) = \sum_{fr=1}^{l} \sum_{(i,j) \in w} A_{i,j}, \quad (12)$$

$$(A_{i,j} = 1, \text{ if } \varphi_{i,j} \in N_k; A_{i,j} = 0 \text{ otherwise}),$$

where fr refers to the frame number in the shot sequence which contains motion vector data, l refers to the total number of frames in the shot, w refers to the tracking window, $\phi$ refers to the motion vector angle and $N_k$ refers to a particular motion vector angle bin (i.e., angle range) within the total number of bins n.

The motion vector angle histogram is normalized to produce a probability distribution function p(t) as follows:

$$p(t) = AH_{i,j}(t) / \Sigma_{k=1}^{n} AH_{i,j}(k) \quad (13)$$

where $t \in [1,n]$. Each normalized angle histogram bin value is then respectively multiplied by the logarithm of that value and summed in the following manner to produce the motion vector angle energy value for the macro block under consideration:

$$AngEn_{i,j} = -\sum_{t=1}^{n} p(t) \log p(t) \quad (14)$$

where the value range of $AngEn_{i,j}$ is [0, log n].

The MVAE values are quantized into 256 gray levels and MVAE image is formed. In a MVAE image, the lighter the pixel is, the higher its energy, and the more intensive its motion.

4. Motion Energy Flux

In the case of generating either a PMES, STE or MVAE image, as the histogram accumulation process proceeds, the number of frames processed becomes greater and greater. As a result, a new accumulated frame will make less and less contribution to the probability distribution function. Accordingly, the entropy will approach a stable value, which is referred to as energy saturation or overexposure. Conversely, if the number of frames observed is insufficient, the state distribution is uncertain, and the entropy will be very low and unstable. This case is called energy sparseness or underexposure. In both cases, the PMES, STE or MVAE image may not capture the energy of the moving objects in a discernable and distinguishable way. As will be discussed later in connection with exemplary applications of the PMES, STE or MVAE images, proper exposure is often important to their success.

In order to obtain a properly exposed PMES, STE or MVAE image, the exposure of energy is controlled. To accomplish this, let $\Phi$ denote the energy flux captured by a PMES, STE or MVAE image. Then, $\Phi$ is determined by three factors: 1) the size of the aforementioned tracking window W (where the window is a square window covering an W×W pixel area), 2) the duration of accumulating time I (namely the number of frames processed), and 3) the motion intensity of video clip $\epsilon$ (which is characterized as the average energy of the video clip). When these three parameters are given, the energy flux can be defined by:

$$\Phi = C \cdot \epsilon \cdot I \cdot W^2 \quad (15)$$

where C is a normalization coefficient.

The motion intensity coefficient $\epsilon$ associated with a PMES or MVAE image includes two components, as follows:

$$\epsilon = c_1 \cdot \alpha + c_2 \cdot \beta \quad (16)$$

The first component $\alpha$ represents the energy contained in the magnitude of the motion vectors, and the other component $\beta$ represents the energy contained in the angle variation of motion vector. The coefficients $c_1$ and $c_2$ are weights assigned to the respective first and second components.

The motion vector magnitude energy component $\alpha$ is characterized as the mean magnitude of the motion vectors in the optical flow field. Thus, $$\alpha = \frac{1}{l \cdot m} \sum_{fr=1}^{l} \sum_{(i,j) \in fr} \sqrt{dx_{i,j}^2 + dy_{i,j}^2}, \quad (17)$$

where $(dx_{i,j}, dy_{i,j})$ is the motion vector of a macro block, fr refers to the frame number in the shot sequence of those frames containing motion vector data and m is the number of macro blocks in a frame. Similarly, the motion vector angle energy component $\beta$ is characterized as the average variation in the motion vector angle in optical flow field. Thus, $$\beta = \frac{1}{n} \sum_{k=1}^{n} \left( H(k) - \frac{1}{n} \sum_{i=1}^{n} H(i) \right)^2, \quad (18)$$

where $H(k)$ is the angle variation histogram of the shot, which is defined by:

$$H(k) = \sum_{fr=1}^{l} \sum_{(i,j) \in fr} A_{i,j} \text{ with} \quad (19)$$

$$\left( A_{i,j} = 1, \text{ if } \varphi_{i,j} \in N_k; A_{i,j} = 0 \text{ otherwise} \right)$$

The values assigned to $c_1$ and $c_2$ depend on the type of video sequence being processed and are chosen based on what aspect of motion is most important in distinguishing the video clip. For example, if the sequence has a lot of motion, such as might occur in a video clip of a sporting event, the magnitude of the motion vectors will be large. In this case, the value of the $c_1$ weighting coefficient should be lower in comparison to the $c_2$ coefficient, as the magnitude of the motion is not as important in creating a distinctive PMES or MVAE image, as is the type of motion that is captured by the angle variation component of the motion intensity coefficient (which could for example distinguish the type of sport). Conversely, in a video sequence exhibiting relatively little motion, such as might be the case in a surveillance video, the value of the $c_1$ weighting coefficient should be made higher in comparison to the $c_2$ coefficient, as in this case the magnitude of the motion is often more important in creating a distinctive PMES or MVAE image, than is the type of motion (which may be as common as people walking). For example, in the case of a sports video, $c_1$ and $c_2$ could be set to 0.4 and 0.6 respectively, and vice versa for a surveillance video.

Unlike the PMES and MVAE images, the motion intensity coefficient $\epsilon$ associated with a STE image involves only one motion energy factor, such that:

$$\epsilon = c\alpha \quad (20)$$

Here, the motion energy factor $\alpha$ represents the variation in color intensity at every pixel position. This is characterized using the color histogram of the shot as follows:

$$\alpha = \frac{1}{n_Y \cdot n_U \cdot n_V} \sum_{Y=1}^{n_Y} \sum_{U=1}^{n_U} \sum_{V=1}^{n_V} \quad (21)$$

$$\left( H(Y, U, V) - \frac{1}{n_Y \cdot n_U \cdot n_V} \sum_{Y=1}^{n_Y} \sum_{U=1}^{n_U} \sum_{V=1}^{n_V} H(Y, U, V) \right)^2,$$

where $$H(Y, U, V) = \sum_{fr=1}^{l} \sum_{x=0}^{m-1} \sum_{y=0}^{n-1} C_{x,y}, \text{ with} \quad (22)$$

$$\left( C_{x,y} = 1, \text{ if } Y_{x,y} \in N_Y, \right.$$

$$\left. U_{x,y} \in N_U, V_{x,y} \in N_V; C_{x,y} = 0 \text{ otherwise} \right).$$

In Eq. (22), x and y refer to the pixel coordinates in a frame having a m×n pixel resolution.

As for c, it is a normalizing coefficient, which can be the reciprocal of the maximum color variation observed in the pixel color levels among every pixel in each of the inputted frames.

In PMES, STE and MVAE images, the tracking window size w controls the energy flux like the aperture of camera, and the accumulating time I controls the time of energy accumulation like the shutter of camera. If w is too large, the image would be blurred. Accordingly, a small value is preferably assigned to w. For example, a w equal to 5 or even 3 macro blocks or pixels (or other unit frame region as the case may be) would be appropriate. As can be seen, the frames of the shot define the motion intensity coefficient $\epsilon$, and by fixing the tracking window size w to an appropriate value, the energy flux $\Phi$ is controlled mainly by the accumulating time I. Accordingly, the key to creating a PMES, STE or MVAE image that captures the energy of the moving objects in a discernable and distinguishable way is to choose a value of I that is large enough to prevent underexposure, but not so large as to create an overexposed condition.

Figure 5:
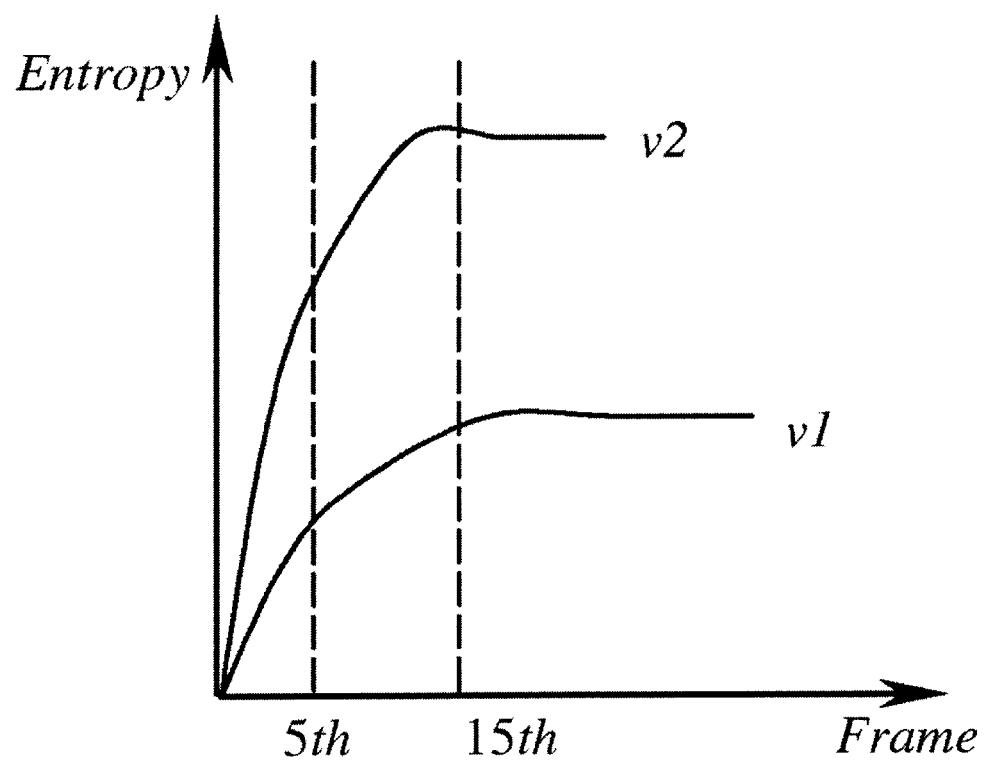
FIG. 5 is a graph of the average cumulative energy of two different STE images, the first of which was derived from a sequence of frames monitoring a relatively static scene and the other from a sequence depicting a sports event.

To establish the correct value of I so as to ensure a properly exposed PMES, STE or MVAE image, it is helpful to first study the trend of energy flux increase during spatio-temporal accumulation for different video clips. For the purposes of this study, two representative video clips will be employed and the energy flux trend associate with generating a STE image will be considered. One of the video clips is a sequence monitoring a scene, and is denoted by v1. The other is a sport game sequence, denoted by v2. The average energy curves of their STE images are drawn in the graph depicted in FIG. 5. Both curves resemble a logarithm function curve. The average energy increases rapidly at the beginning of accumulation, and approaches saturation after a period of time. Due to the difference of motion intensity between a monitored scene and a sporting event, the average energy in v2's STE image is higher than that in v1's. In addition, the speed of energy increase in v2's STE image is faster than in v1's, and the curve of v2 enters the saturated segment earlier than that of v1. As FIG. 5 shows, the best time to obtain a properly exposed STE image is at the slowly increasing segment of the curves before the saturated segment. For example, the suitable accumulation time I for video clip v1 is from 5 to 15 frames.

In view of the foregoing study, it is possible to set the accumulation time to ensure proper exposure in a couple of different ways. The first method involves prescribing the number of frames processed in creating a PMES, STE or MVAE image. For example, in the graph of FIG. 5, it can be seen that an accumulation time equal to about eight frames would fall within the slowly increasing segment prior to saturation for both curves. Given that the v1 curve represent a video sequence with little motion, while the v2 curve represent a sequence with a lot of action, it can be seen that a choice of about eight frames would ensure a properly exposed image for a wide variety of video shots. However, the value of I can also be determined on the fly. Namely, it is possible to establish a threshold for the rate of increase in the average energy, which would be used as follows. When the rate of average energy increase slows to or below the established threshold, the processing of addition frames would cease. The number of accumulated frames at that point would be deemed the value of I for correct exposure.

It is evident from the foregoing discussion that the value chosen for the accumulating time (i.e., the number of frames processed) may result in less than all the frames of a shot under consideration being characterized as a PMES, STE or MVAE image. If this is the case, the shot would simply be characterized using a series of images, rather than just one. The converse is also possible where the shot under consideration has fewer frames than are necessary to meet the chosen value for the accumulating time. This may preclude effectively characterizing the shot using a PMES, STE or MVAE image. However, if the number of frames in the shot is not significantly less than the number of frames needed to achieve the desired accumulating time for a properly exposed image, then the resulting image should still be useful. As can be seen in the graph of FIG. 5, the region in which the image is considered to be properly exposed covers a range of frame totals. Accordingly, there will typically be some leeway that allows deviation from the chosen value of the accumulating time.

5. Characterization Process Summary 5.1 Perceived Motion Energy Spectrum Images

Figure 6A:
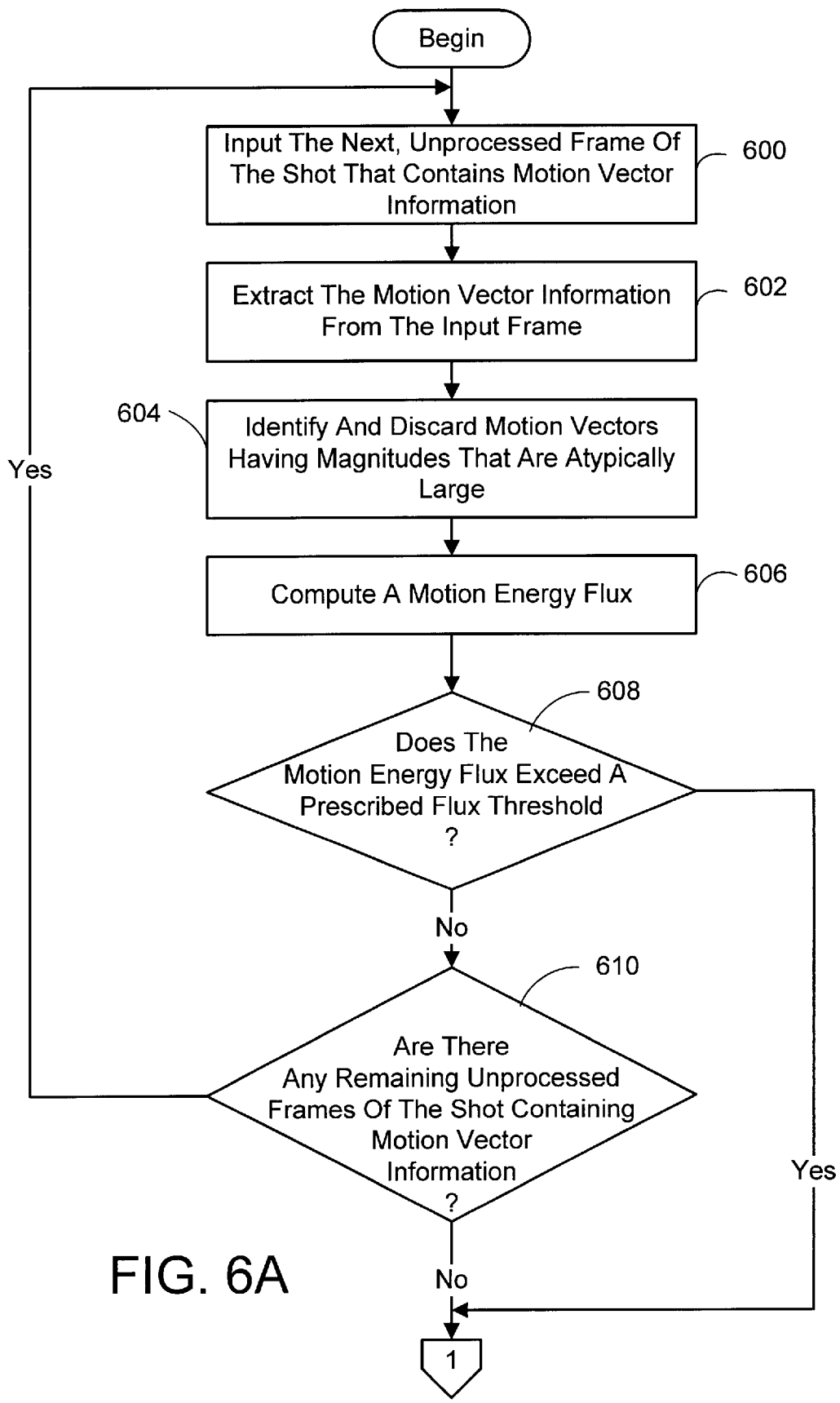
FIGS. 6A–B are a flow chart diagramming a process for generating a PMES image from a sequence of video frames that implements the characterizing technique of FIG. 2.
Figure 6B:
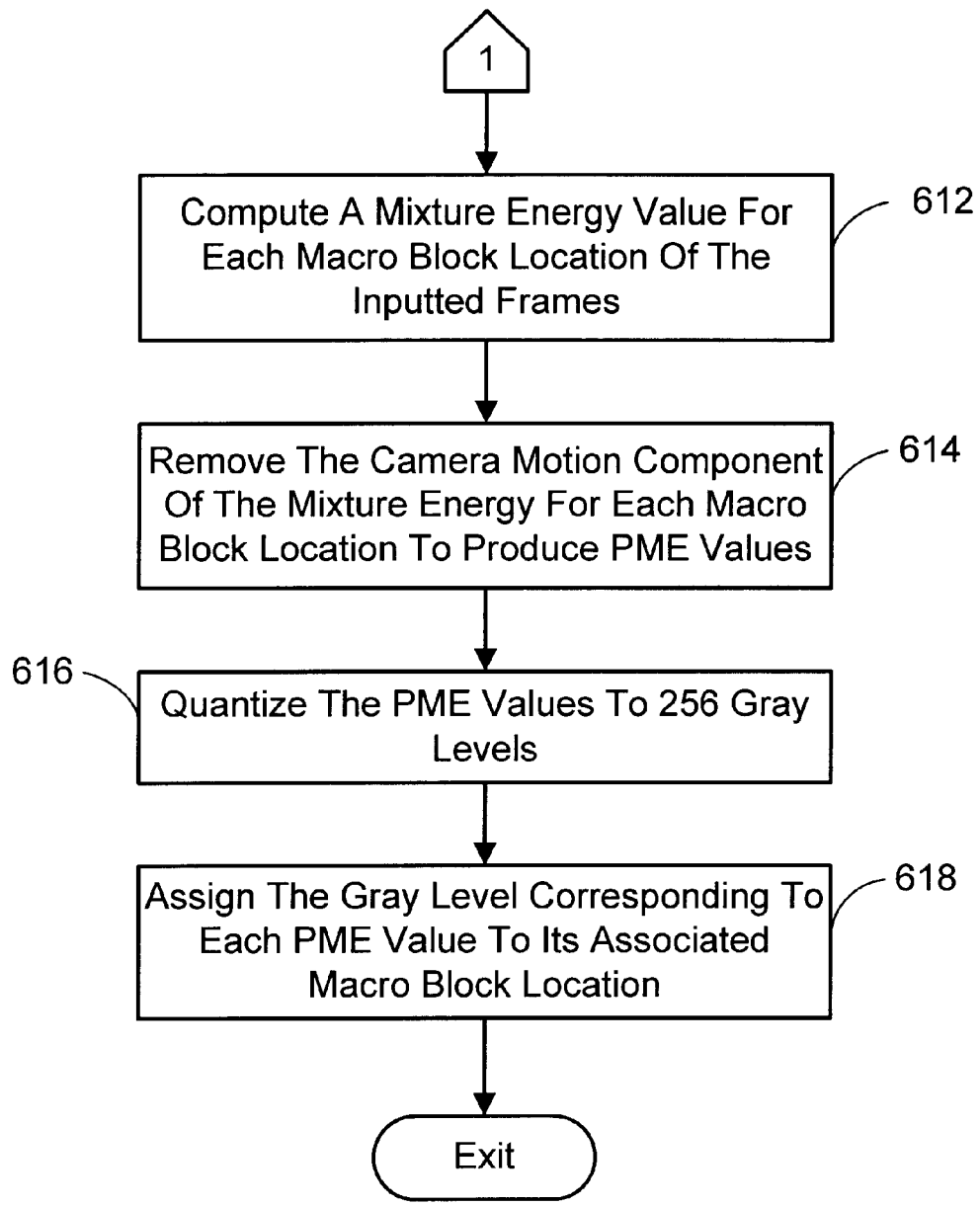
Figure 7A:
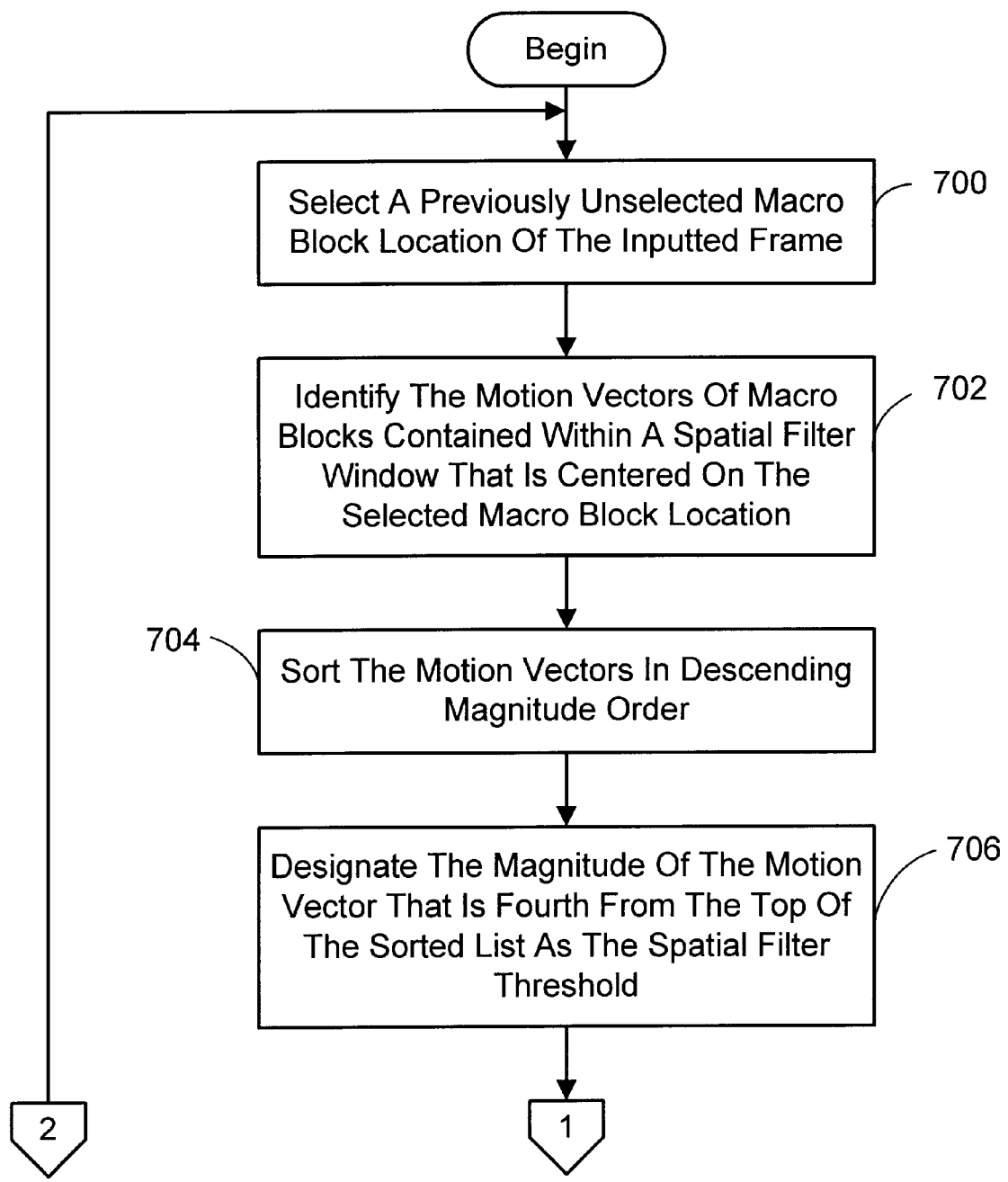
FIGS. 7A–B are a flow chart diagramming a spatial filtering process for identifying and discarding motion vectors having a typically large magnitudes in accordance with the process of FIGS. 6A–B.
Figure 7B:
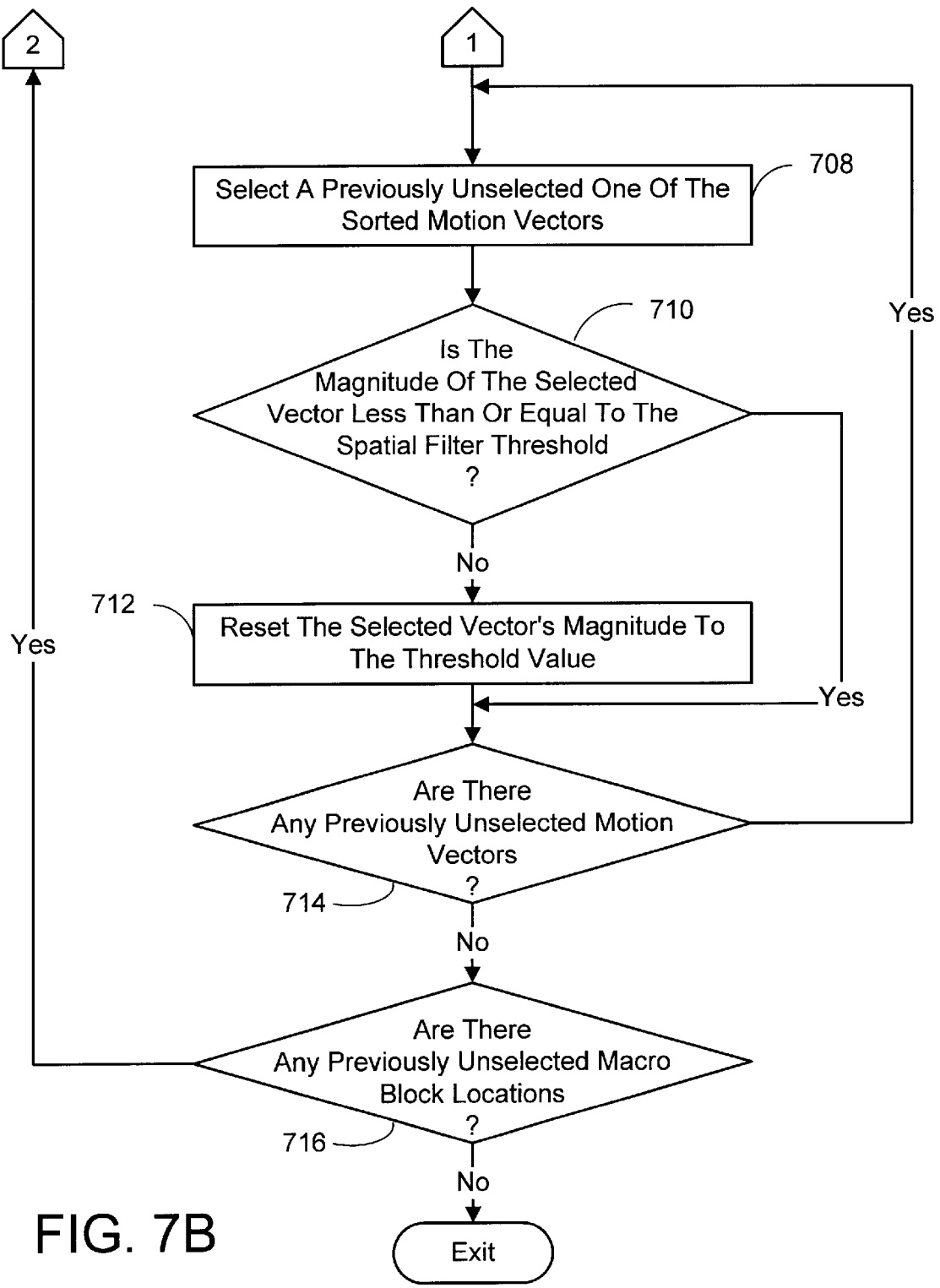

Referring to FIGS. 6A-B, the process for generating a PMES image begins by inputting a frame of the shot (process action 600). Specifically, the next frame in the sequence of frames making up the shot that has yet to be processed and which contains motion vector information is input. The motion vector information is then extracted from the input frame (process action 602). Next, those motion vectors having magnitudes that are a typically large are identified and discarded preferably using a spatial filtering procedure (process action 604). Specifically, referring now to FIG. 7, the spatial filtering procedure involves first selecting a previously unselected macro block location of the inputted frame (process action 700). This assumes that a macro block scale is being employed. If some other unit of location is being used, such as pixel, then this would be selected instead and used throughout the remainder of the procedure in lieu of the macro block locations. The spatial filtering procedure continues with the identification of all the motion vectors associated with macro blocks contained within a prescribed-sized spatial filter window that is centered on the selected macro block location (process action 702). The motion vectors are then sorted in descending order according to their magnitudes (process action 704). The magnitude value of the motion vector that is fourth from the top of the sorted list is designated as the spatial filter threshold (process action 706). Next, a previously unselected one of the sorted motion vectors is selected (process action 708), and it is determined whether the magnitude of the selected vector is less than or equal to the designated spatial filter threshold value (process action 710). If it is less than or equal to the threshold, then it remains unaltered. However, if the magnitude of the selected vector exceeds the threshold value, then the vector's magnitude is reset to equal the threshold value (process action 712). It is then determined if there are any more previously unselected motion vectors remaining (process action 714). If so, then process actions 708 through 714 are repeated. If not, then it is determined if there are any remaining previously unselected macro block locations remaining (process action 716). If there are, then process actions 700 through 716 are repeated until all the macro block locations have been filtered. When the last macro block location is processed, the spatial filtering procedure ends.

Figure 8:
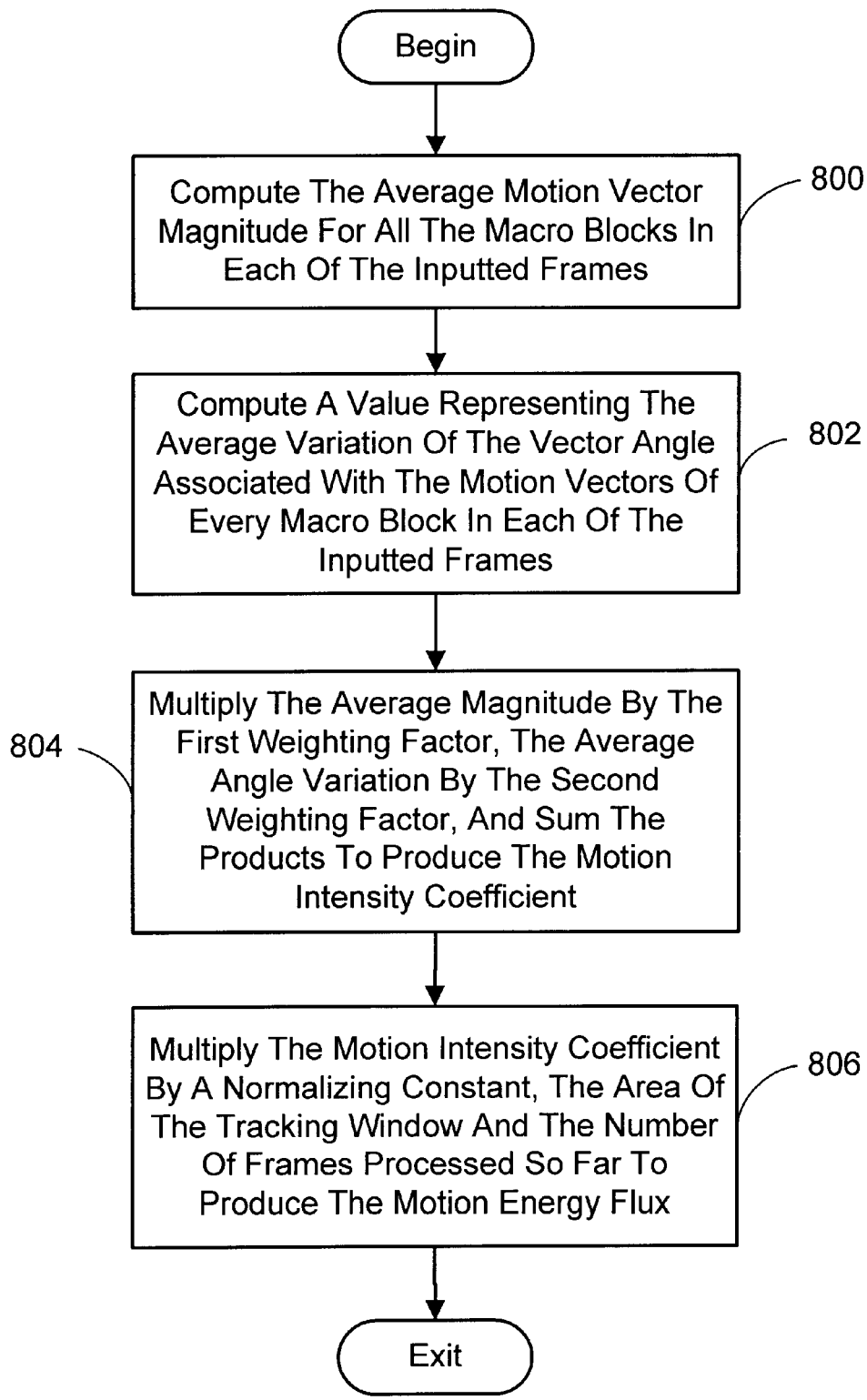
FIG. 8 is a flow chart diagramming a process for computing the motion energy flux in accordance with the process of FIGS. 6A–B.

Referring once again to FIG. 6A, the next action 606 in the PMES image generation process involves computing a motion energy flux that takes into account all the motion vector information of the frames input so far. It is then determined if the motion energy flux exceeds a prescribed flux threshold value (process action 608). If it does not exceed the threshold, more motion vector information can be added. To this end, it is first determined whether there are any remaining previously unprocessed frames of the shot containing motion vector information (process action 610). If so, process actions 600 through 610 are repeated, until either the threshold is exceeded or there are no more frames of the shot to process. The procedure used to compute the motion energy flux is outlined in the flow diagram of FIG. 8. Specifically, the average motion vector magnitude is computed for all the macro blocks in each of the inputted frames (process action 800). In addition, a value representing the average variation of the vector angle associated with the motion vectors of every macro block in each of the frames is computed (process action 802). The average magnitude is multiplied by the first weighting factor described previously, the average angle variation is multiplied by the previously described second weighting factor, and then these products are summed to produce the motion intensity coefficient (process action 804). This motion intensity coefficient is then multiplied by a normalizing constant, the area of the tracking window and the number of frames input so far, to produce the motion energy flux value (process action 806).

Referring to FIG. 6B, whenever the flux threshold is exceeded by the motion energy flux value, or there are no remaining frames of the shot, a mixture energy value is computed for each macro block location (process action 612). As described previously, the mixture energy value reflects both the camera and object motion associated with a macro block location. The camera motion component of the mixture energy for each macro block location is removed using a global filter procedure (process action 614), thereby leaving just the object motion portion of the mixture energy value. This object motion portion of the energy is the perceived motion energy (PME) discussed previously.

Figure 9:
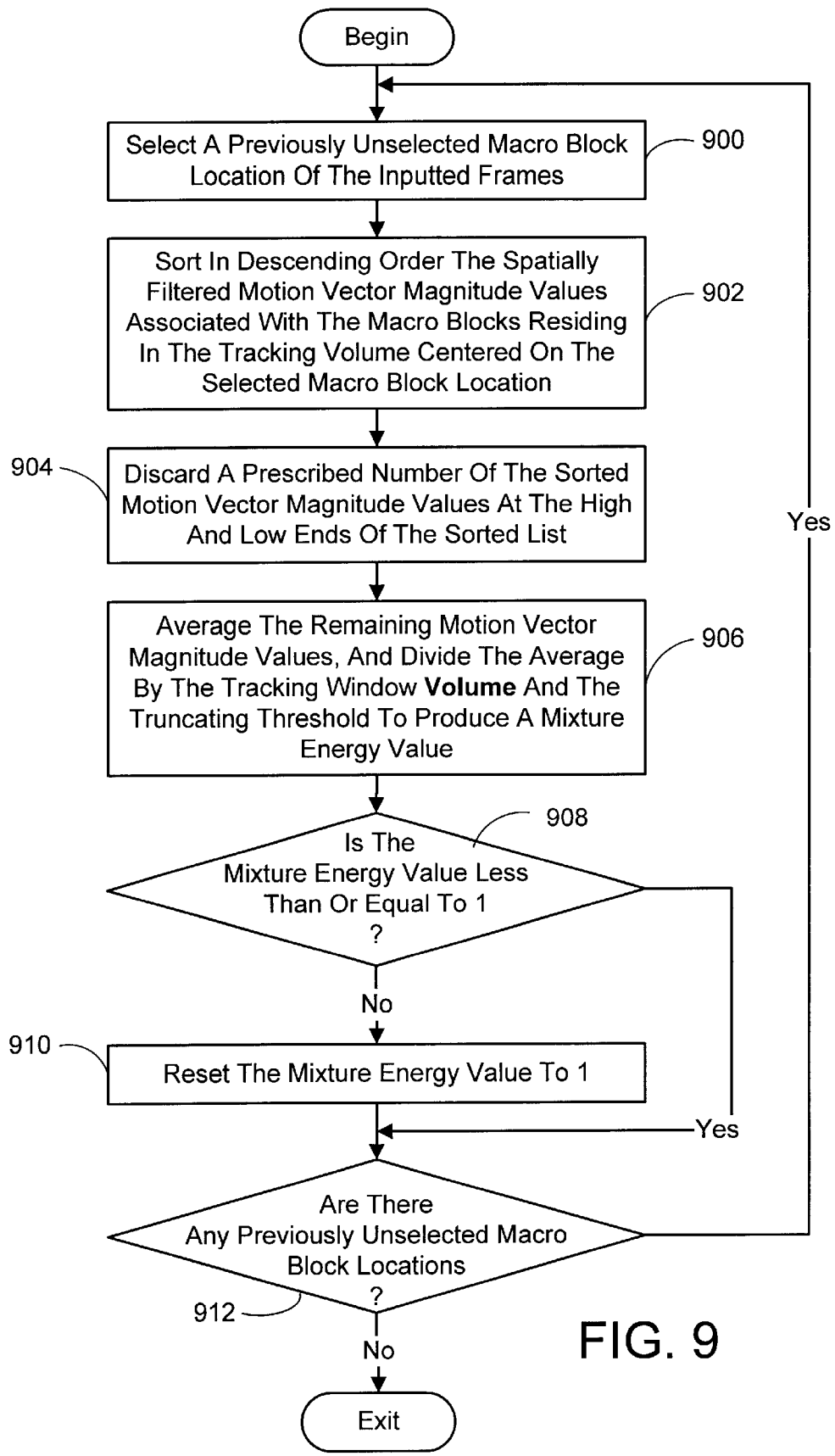
FIG. 9 is a flow chart diagramming a process for computing a mixture energy value for each macro block location in accordance with the process of FIGS. 6A–B.

Specifically, referring to FIG. 9, the mixture energy values are computed by first selecting a previously unselected macro block location (process action 900). Then, the spatially filtered motion vector magnitude values associated with the macro blocks residing in a tracking volume defined by the tracking window centered on the selected macro block and the sequence of inputted frames, are sorted in descending order (process action 902). A prescribed number of the sorted motion vector magnitude values at the high and low ends of the sorted list are discarded (process action 904).

This is followed by averaging the remaining values, and dividing the average by the tracking window area and the number of the accounted frames, and a prescribed truncating threshold (process action 906). The result is a mixture energy value. It is then determined in process action 908 whether the mixture energy value is less than or equal to 1. If it is, then no change is made to the value. However, if the mixture energy value is greater than 1, then the value is reset to equal 1 (process action 910). It is then determined if there are any remaining previously unselected macro block locations (process action 912). If so, then process actions 900 through 912 are repeated until all the macro block locations are processed.

Figure 10:
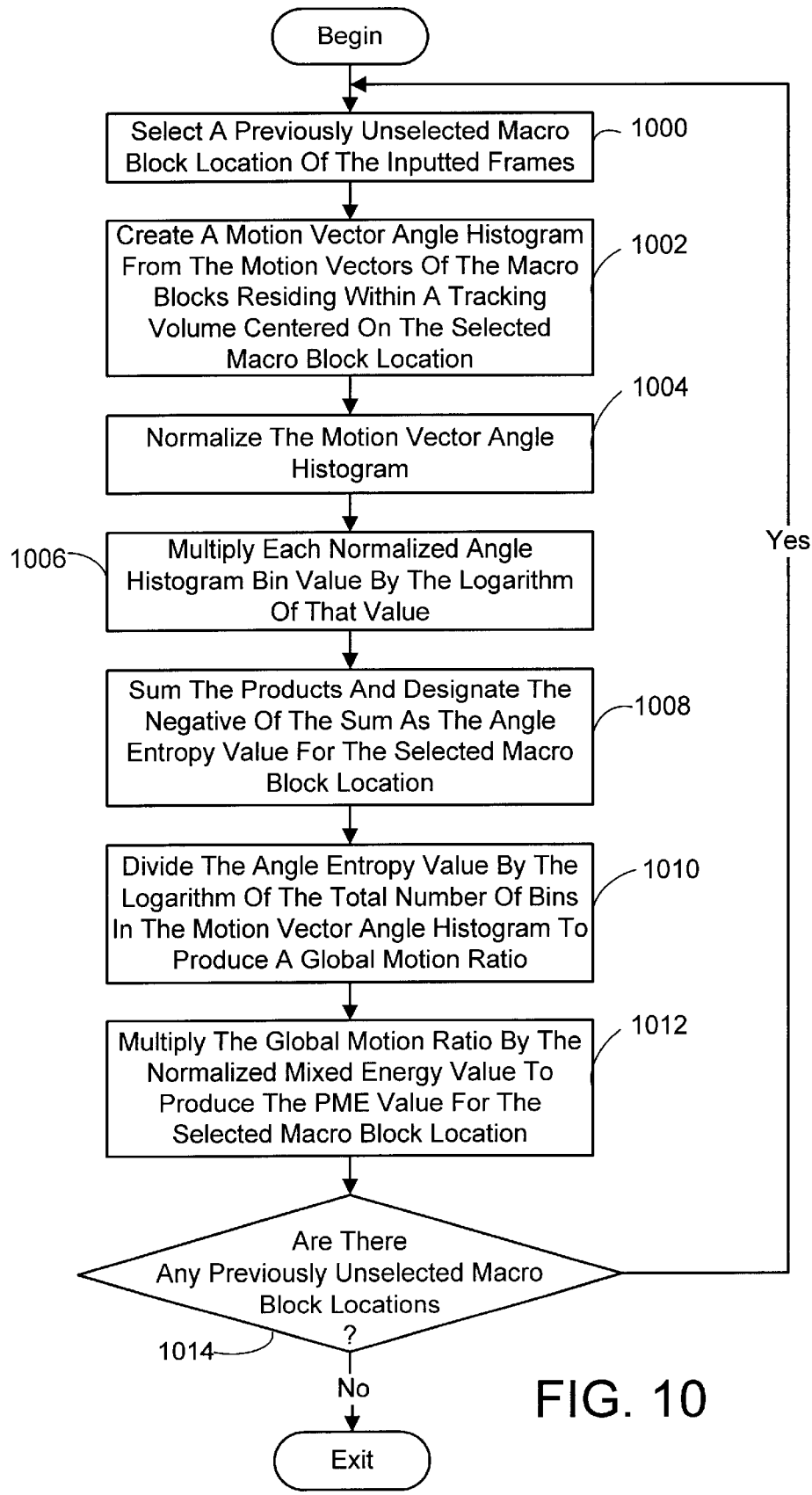
FIG. 10 is a flow chart diagramming a process for computing the PME values for each macro block location in accordance with the process of FIGS. 6A–B.

Referring now to FIG. 10, the global filter procedure will be described. First, a previously unselected macro block location is selected (process action 1000). A motion vector angle histogram is then created by assigning to each of a set of angle range bins, the number of vector angles associated with the macro blocks residing within the tracking volume centered about the selected macro block location, which fall into the bin (process action 1002). The motion vector angle histogram is normalized by respectively dividing the total number of motion vector angles falling into each bin by the sum of the number of angles falling into all the bins (process action 1004). Each normalized angle histogram bin value is then respectively multiplied by the logarithm of that value (process action 1006). These products are summed and the negative value of the sum is designated as the motion vector angle entropy value for the selected macro block location (process action 1008). Next, the angle entropy value is divided by the logarithm of the total number of bins in the motion vector angle histogram to produce a normalized angle entropy value representing the global motion ratio (process action 1010). The global motion ratio is multiplied by the normalized mixed energy value to produce the PME value for the selected macro block location (process action 1012). Finally, it is determined if there are any remaining previously unselected macro block locations (process action 1014). If so, then process actions 1000 through 1014 are repeated until all the macro block locations are processed.

It is noted that in the foregoing procedures for computing the mixed energy values and the global energy filtering, the mixed energy value was computed for each macro block location prior to using the global filtering to compute a PME for each macro block location. This facilitated the description of these procedures. However, it is also possible to compute the mixed energy value for a macro block location and then apply global filter to just that location to derive the PME value. Then the next macro block location would be selected and so on, with a PME value being computed for the currently selected macro block before going on to the next. Either approach is acceptable and are considered equivalent.

Referring once again to FIG. 6B, the PMES image generation process concludes with the PME values computed for each of the macro block locations being quantized to 256 gray levels (process action 616). The gray level corresponding to each PME value is then assigned to its associated macro block location to create the PMES image (process action 618).

5.2 Spatio-Temporal Entropy Images

Figure 11:
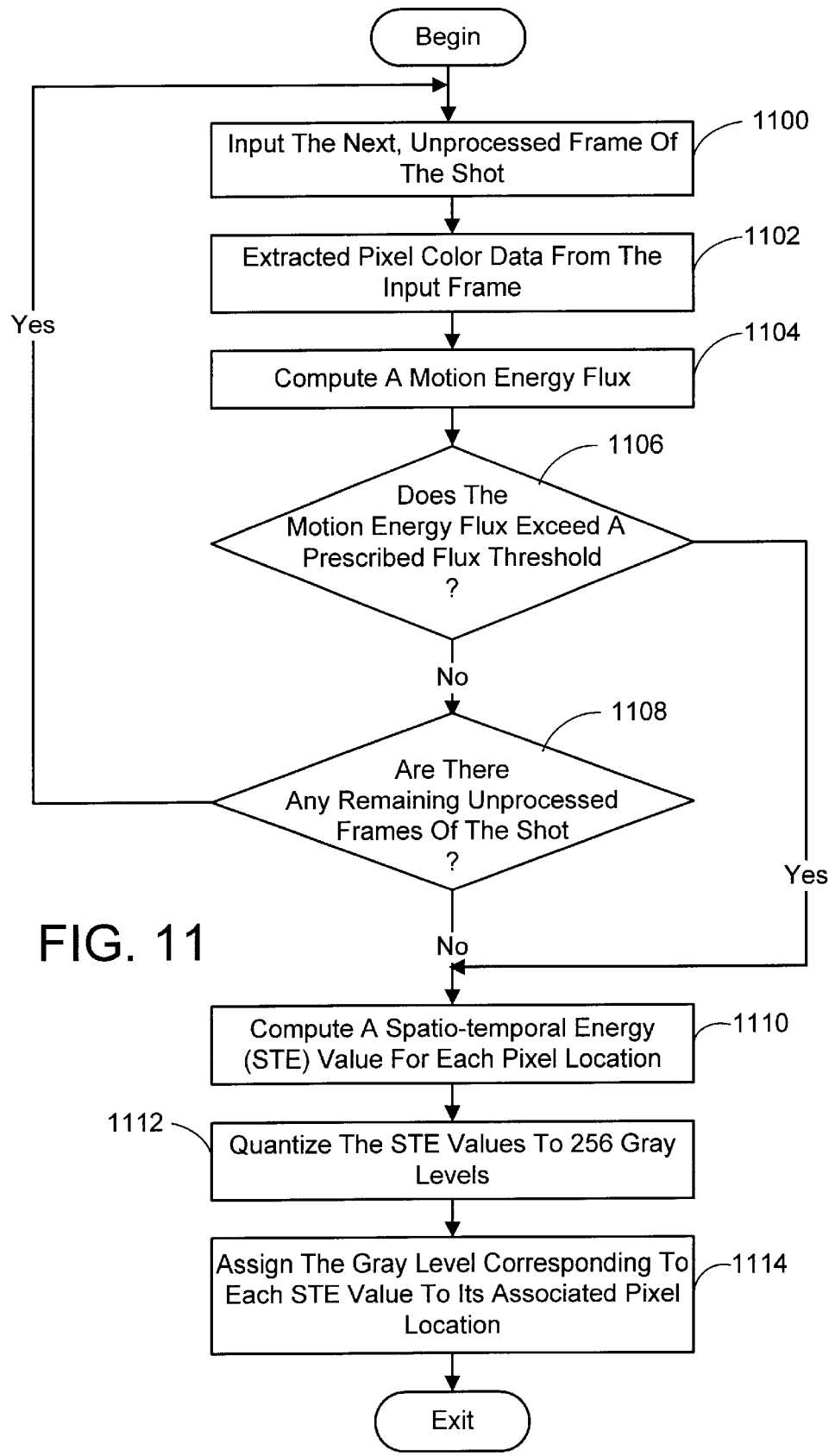
FIG. 11 is a flow chart diagramming a process for generating a STE image from a sequence of video frames that implements the characterizing technique of FIG. 2.

Referring to FIG. 11, the process for generating a STE image begins by inputting a frame of the shot (process action 1100). Pixel color information is then extracted from the input frame (process action 1102). It is noted that the pixel color extraction may require the frame to be decoded if the shot has been encoded. In addition, the pixel color extraction action assumes that the shot is a sequence of color frames. However, it is also possible to characterize gray scale shots as well. If the frames of the shot are gray scale images, then the gray levels would be extracted instead and used throughout the remainder of the procedure in lieu of the color levels.

Figure 12:
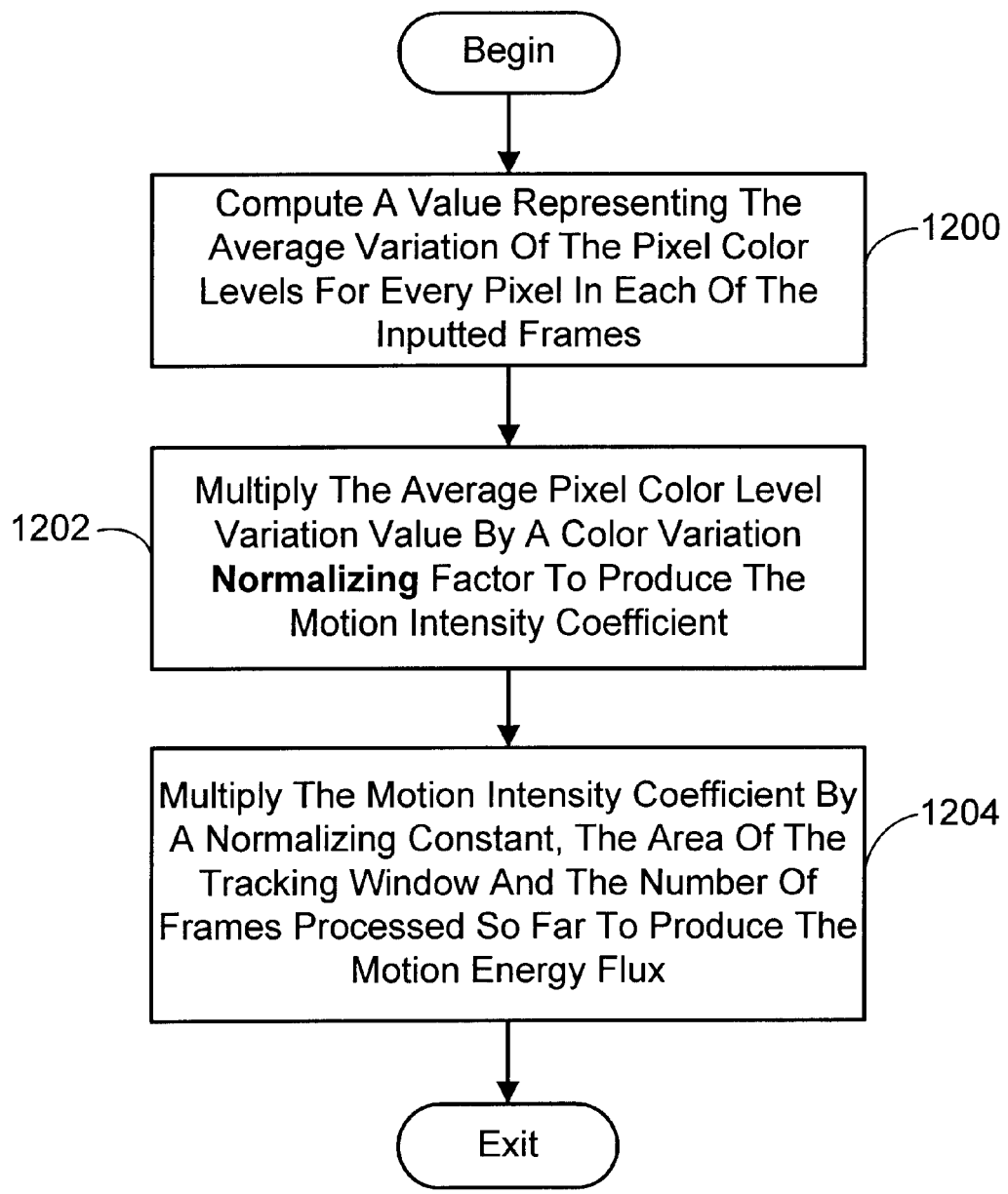
FIG. 12 is a flow chart diagramming a process for computing the motion energy flux in accordance with the process of FIG. 11.

The process of generating a STE image continues with the process action 1104 of computing a motion energy flux that takes into account all the pixel color information of the frames input so far. It is then determined if the motion energy flux exceeds a prescribed flux threshold value (process action 1106). If it does not exceed the threshold, more pixel color information can be added. To this end, it is first determined whether there are any remaining previously unprocessed frames of the shot (process action 1108). If so, process actions 1100 through 1108 are repeated, until either the threshold is exceeded or there are no more frames of the shot to process. It is noted that this is the same procedure used to ensure the PMES image is properly exposed. However, there is a difference in the way the motion energy flux is computed, and in particular in the way the motion intensity coefficient is computed. This modified procedure is outlined in the flow diagram of FIG. 12. Specifically, a value representing the average variation of the pixel color levels for every pixel in each of the frames is computed (process action 1200). The average color variation is multiplied by the previously described color variation weighting factor to produce the motion intensity coefficient (process action 1202). This motion intensity coefficient is then multiplied by a normalizing constant, the area of the tracking window and the number of frames input so far, to produce the motion energy flux value (process action 1204).

Figure 13:
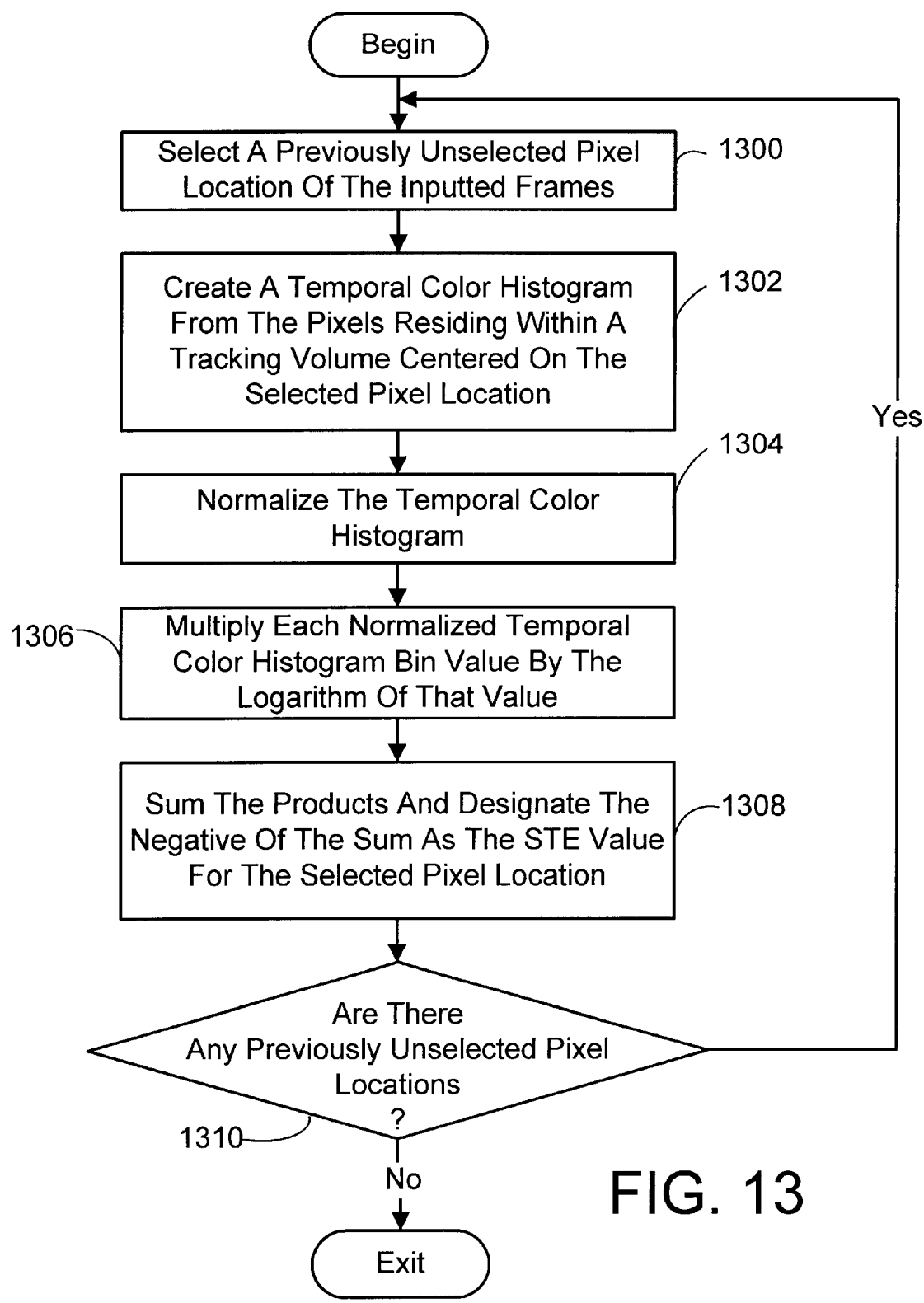
FIG. 13 is a flow chart diagramming a process for computing the STE values for each macro block location in accordance with the process of FIG. 11.

Referring again to FIG. 11, whenever the flux threshold is exceeded by the motion energy flux value, or there are no remaining frames of the shot, a spatio-temporal energy (STE) value is computed for each pixel location (process action 1110). Specifically, referring to FIG. 13, one way of accomplishing this task is to first select a previously unselected pixel location (process action 1300). A temporal color histogram is then created by assigning to each of a set of color space range bins, the number of pixels residing within the tracking volume defined by the tracking window centered on the selected pixel location and the sequence of inputted frames, which fall into that bin (process action 1302). The temporal color histogram is normalized by respectively dividing the total number of pixels whose color levels fall into each bin by the sum of the number of pixels whose color levels fall into all the bins (process action 1304). Each normalized temporal color histogram bin value is then respectively multiplied by the logarithm of that value (process action 1306). These products are summed and the negative value of the sum is designated as the STE value for the selected pixel location (process action 1308). Finally, it is determined if there are any remaining previously unselected pixel locations (process action 1310). If so, then process actions 1300 through 1310 are repeated until all the pixel locations are processed.

Referring once again to FIG. 11, the STE image generation process 30 concludes with the STE values computed for the pixel locations being quantized to 256 gray levels (process action 1112). The gray level corresponding to each STE value is then assigned to its associated pixel location to create the STE image (process action 1114).

5.3 Motion Vector Entropy Images

Figure 14:
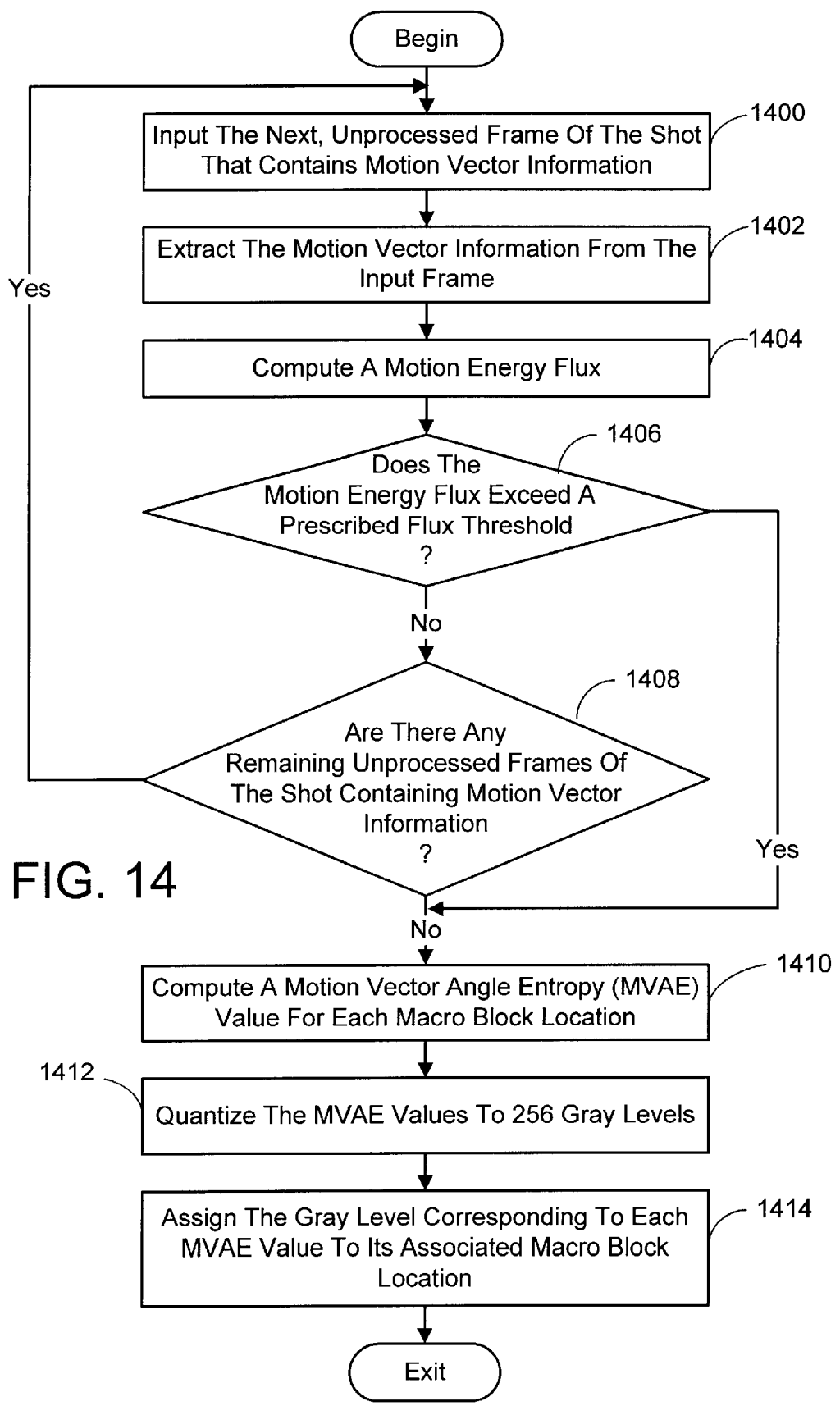
FIG. 14 is a flow chart diagramming a process for generating a MVAE image from a sequence of video frames that implements the characterizing technique of FIG. 2.

Referring to FIG. 14, the process for generating a MVAE image begins by inputting a frame of the shot (process action 1400). Specifically, the next frame in the sequence of frames making up the shot that has yet to be processed and which contains motion vector information is input. The motion vector information is then extracted from the input frame (process action 1402). The motion energy flux is computed next (process action 1404). This flux takes into account all the motion vector information of the frames input so far. It is then determined if the motion energy flux exceeds a prescribed flux threshold value (process action 1406). If it does not exceed the threshold, more motion vector information can be added. To this end, it is first determined whether there are any remaining previously unprocessed frames of the shot containing motion vector information (process action 1408). If so, process actions 1400 through 1408 are repeated, until either the threshold is exceeded or there are no more frames of the shot to process. The procedure used to compute the motion energy flux is the same as was outlined in the flow diagram of FIG. 8 in connection with the generation of a PMES image.

Figure 15:
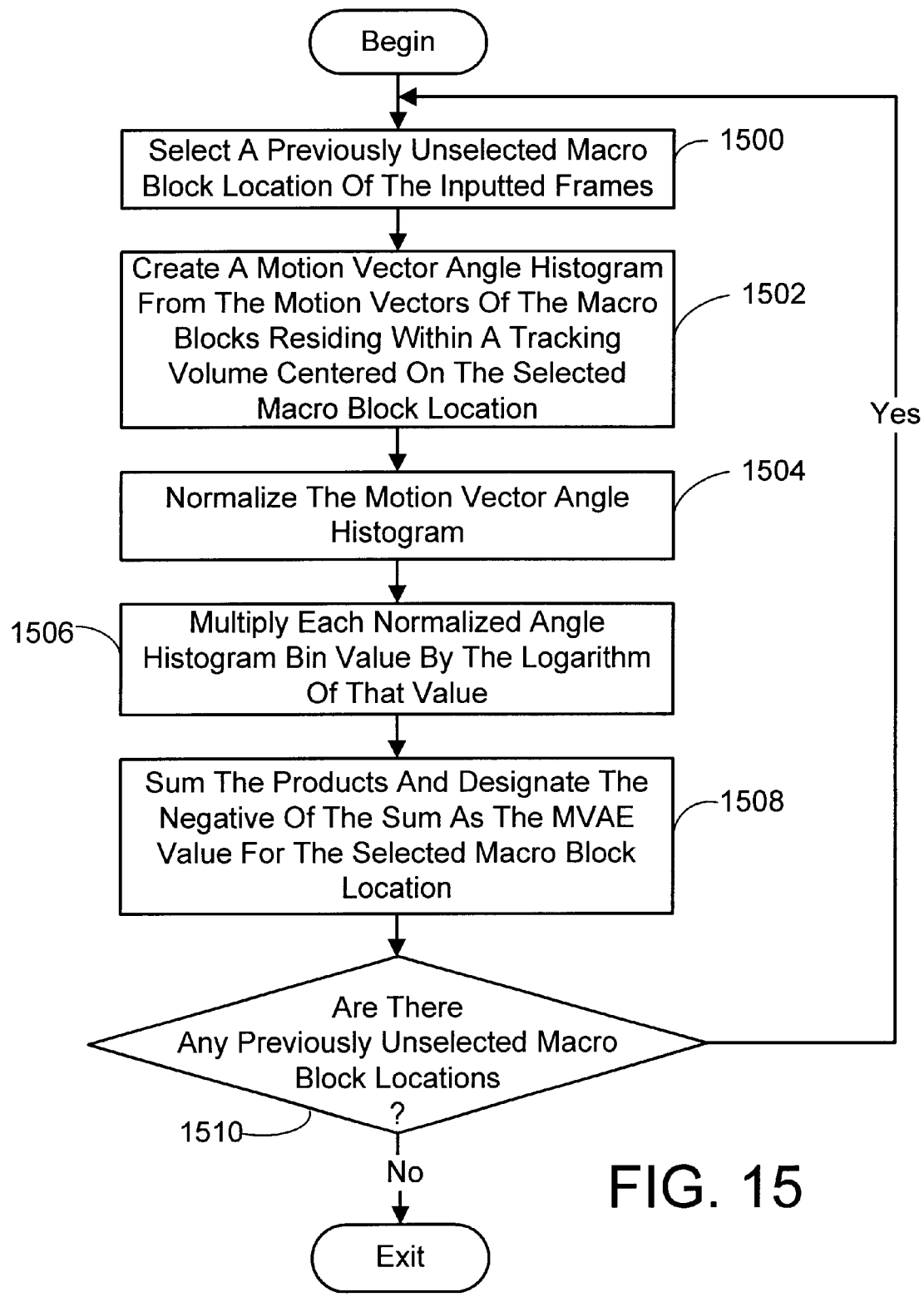
FIG. 15 is a flow chart diagramming a process for computing the MVAE values for each macro block location in accordance with the process of FIG. 14.

Referring again to FIG. 14, whenever the flux threshold is exceeded by the motion energy flux value, or there are no remaining frames of the shot, the MVAE value is computed for each unit frame location, which will be assumed to be a macro block for the purposes of this description (process action 1410). Specifically, referring to FIG. 15, one way of accomplishing this task is to first select a previously unselected macro block location (process action 1500). A motion vector angle histogram is then created by assigning to each of a set of motion vector angle range bins, the number of macro blocks residing within the tracking volume, defined by the tracking window centered on the selected macro block location and the sequence of inputted frames, whose motion vector angles fall into that bin (process action 1502). The motion vector angle histogram is normalized by respectively dividing the total number of macro blocks whose angles fall into each bin by the sum of the number of macro blocks whose angles fall into all the bins (process action 1504). Each normalized motion vector angle histogram bin value is then respectively multiplied by the logarithm of that value (process action 1506). These products are summed and the negative value of the sum is designated as the MVAE value for the selected macro block location (process action 1508). Finally, it is determined if there are any remaining previously unselected macro block locations (process action 1510). If so, then process actions 1500 through 1510 are repeated until all the locations are processed.

Referring once again to FIG. 14, the MVAE image generation process concludes with the MVAE values being quantized to 256 gray levels (process action 1412). The gray level corresponding to each value is then assigned to its associated macro block location to create the MVAE image (process action 1414).

6. Shot Retrieval Applications

Figure 16:
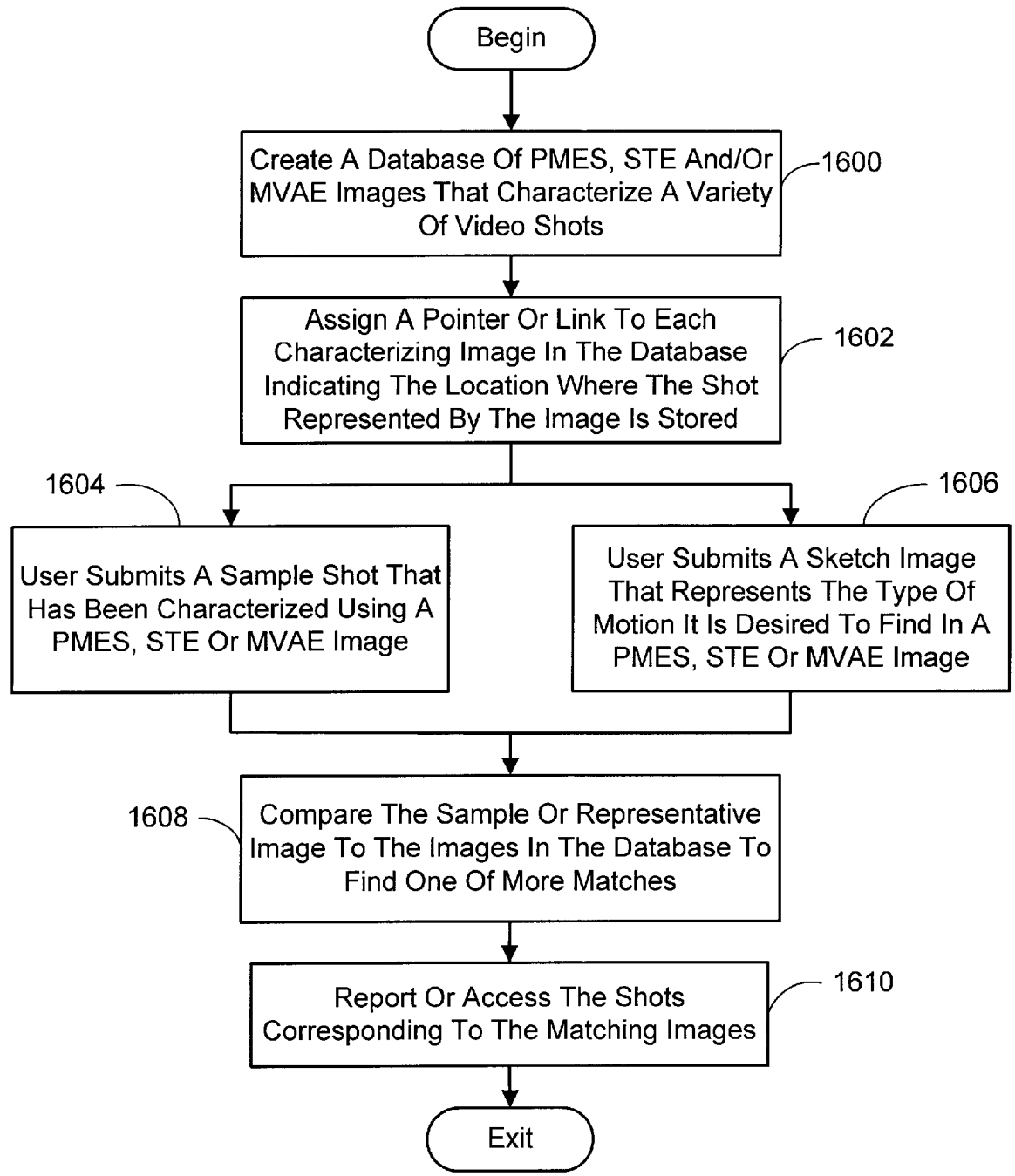
FIG. 16 is a flow chart diagramming a process for using PMES, STE and/or MVAE images in a shot retrieval application.

PMES, STE and MVAE images can be used for a variety of applications, both alone and in combination. For example, one useful application of these images is video shot retrieval. Referring to FIG. 16, one way of implementing shot retrieval is to first create a database of PMES, STE and/or MVAE images that characterize a variety of video shots of various activities (process action 1600). The images are assigned a pointer or link to a location where the shot represented by the image is stored (process action 1602). A user finds shots by submitting a query in one of two ways. First, the user can submit a sample shot that has been characterized using a PMES, STE and/or MVAE image, depending on the database being searched (process action 1604). Alternately, the user could submit a sketch image that represents the type of motion it is desired to find in the database (process action 1606). Specifically, this sketch image is a gray level image showing an energy distribution, which is produced by a user moving an object template in the desired motion pattern. The sample or representative image is then compared to the images in the database to find one or more matches (process action 1608). The location of the shot corresponds to the matching image or images is then reported to the user, or accessed automatically and the shot itself is provided to the user (process action 1610).

The number of shots reported to the user can be handled in a variety of ways. For example, just the shot representing the best match to the user's query could be reported. Alternately, a similarity threshold could be established and all (or a prescribed number of) the database shots associated with a PMES, STE or MVAE image having a degree of similarity to the user's query that exceed the threshold would be reported.

The aforementioned matching process can be done in a variety of ways. The first three of the following sections provide examples of how the matching process can be accomplished for first a PMES based shot retrieval, then a MVAE based shot retrieval, and then a STE based shot retrieval. Finally, a section is included that describes how shot retrieval can be accomplished using a combination of the various characterizing images.

6.1. PMES Based Shot Retrieval

In a PMES image, the value and distribution of the perceived motion energy in a shot are represented by gray level pixels. The pattern of energy variation reflects the object motion trends, even though the PMES images do not include exact motion direction information. Regardless, a PMES image can be used for shot retrieval based on the motion energy characterization. The similarity between two PMES images can be measured by various matching methods, depending on the application. For example, one method is to simply compute an average energy value for each PMES image, and then compare these values. If the difference between two PMES images does not exceed a prescribed threshold, it is deemed that the two shots associated with the PMES images are similar to each other.

Figure 17A:
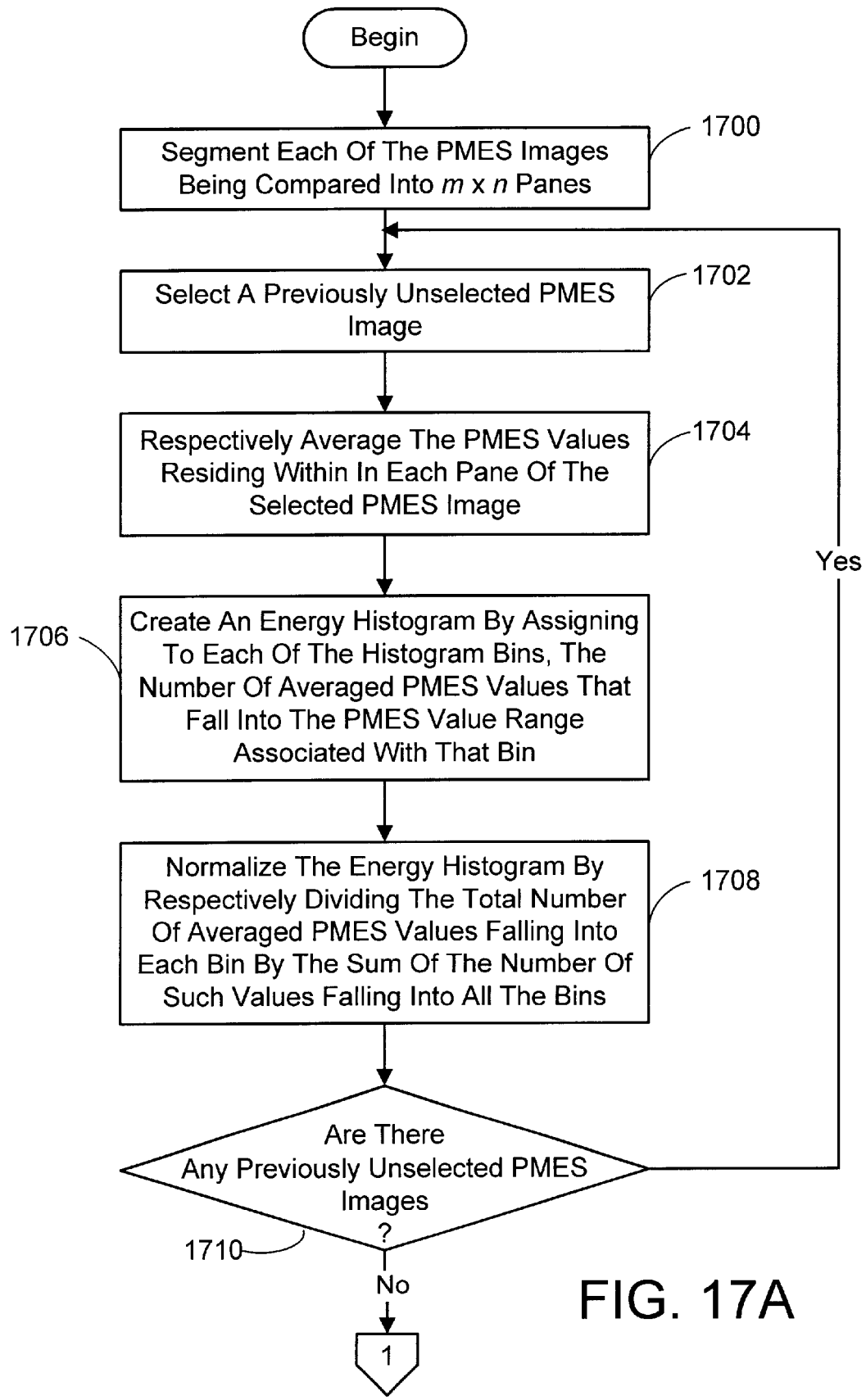
FIGS. 17A–B are a flow chart diagramming a process for comparing PMES images in accordance with the process of FIG. 16.
Figure 17B:
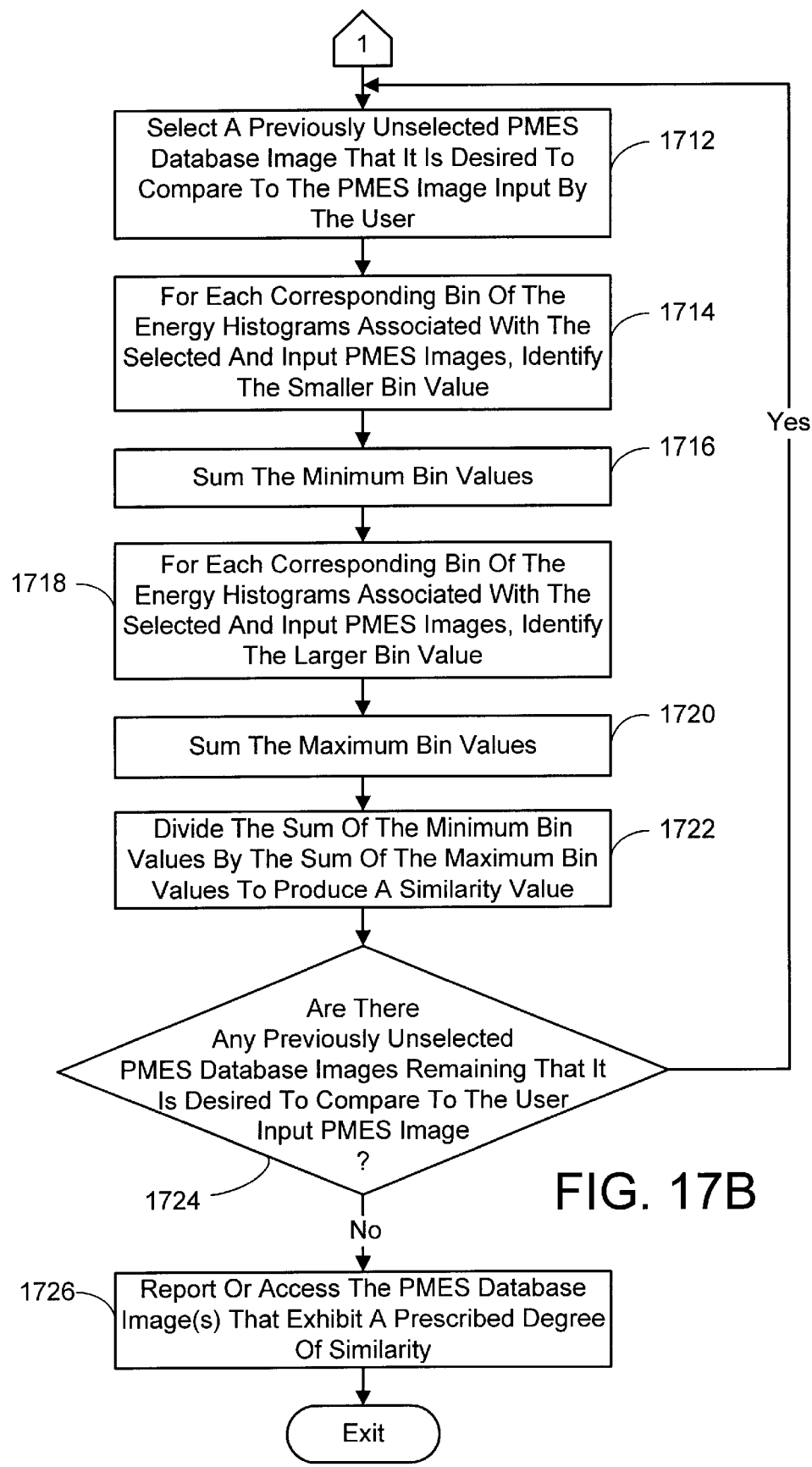

Another comparison method is outlined in FIGS. 17A–B. This comparison method begins by segmenting each of the PMES images being compared into m×n panes, where (m,n) controls the granularity of comparison (process action 1700). A normalized energy histogram with m×n bins is then constructed for each image. Specifically, a previously unselected one of the images to be compared is selected (process action 1702). The PMES values residing within in each pane of the selected PMES image are respectively averaged (process action 1704). An energy histogram is then created by assigning to each of the histogram bins, the number of averaged PMES values that fall into the PMES value range associated with that bin (process action 1706). The energy histogram is normalized by respectively dividing the total number of averaged PMES values falling into each bin by the sum of the number of such values falling into all the bins (process action 1708). It is next determined if there are any remaining PMES images whose energy histogram has not yet been created (process action 1710). If so, process action 1700 through 1710 are repeated. If not, the normalized energy histograms are used to assess the degree of similarity between each pair of images it is desired to compare, as will be described shortly.

It is noted that the energy histograms for the PMES images residing in the aforementioned database could be pre-computed and stored. In this way, instead of computing the histograms for the PMES images each time a query is made, only the PMES image input by the user would be processed as described above to create its energy histogram.

The histogram created from the input PMES image would then by compared to the pre-computed histograms accessible through the database.

The comparison process essentially involves computing a separate similarity value indicative of the degree of similarity between the PMES image input by the user and each of the PMES images of the database that it is desired to compare to the input image. The similarity value between two compared PMES images is defined by Eq. (23).

$$Sim(q,s) = \frac{\sum_{k=1}^{m \times n} \min(EH_q(k), EH_s(k))}{\sum_{k=1}^{m \times n} \max(EH_q(k), EH_s(k))} \tag{23}$$

where Sim∈[0,1], and where Sim=1 indicates that the two shots are most similar to each other. Thus, referring now to FIG. 17B, a previously unselected one of the PMES images in the database that it is desired to compare to the PMES image input by the user, is selected (process action 1712). The degree of similarity between the selected PMES image and the image input by the user is computed by, for each corresponding bin of the energy histograms associated with the two PMES images, first identifying the smaller bin value (process action 1714). The minimum bin values are then summed (process 1716). Next, for each corresponding bin of the energy histograms, the larger of the two bin values is identified (process action 1718). These maximum bin values are then summed (process 1720). Finally, the sum of the minimum bin values is divided by the sum of the maximum bin values to produce the aforementioned similarity value (process action 1722). It is then determined if there are any remaining PMES images in the database that it is desired to compare to the image input by the user (process action 1724). If so, process actions 1712 through 1724 are repeated. If not, then the PMES image or images in the data base that exhibit a prescribed degree of similarity to the PMES image input by the user are reported to the user as described above (process action 1726).

Experimentation has shown the foregoing similarity measure is effective for PMES image comparison, since it matches two PMES images by both absolute energy and energy distribution. The database used in this experimentation included PMES images generated from a MPEG-7 data set. The total duration of the video sequences was about 80 minutes, and included different 864 shots. Eight representative shots were picked up from database to form a query shot set (see the Table in FIG. 18). The ground truths associated with each query shot were defined manually.

Figure 19D:
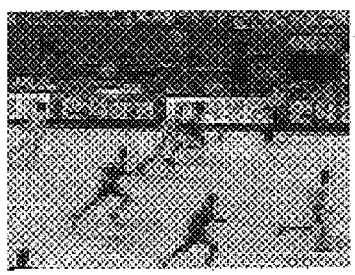
Figure 19E:
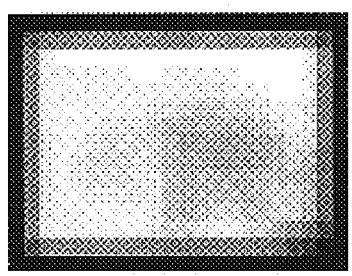
Figure 19F:
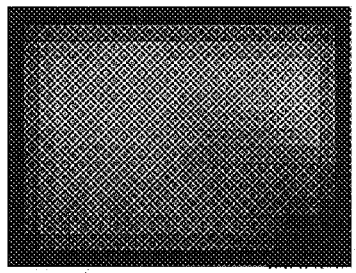
Figure 19G:
Figure 19H:
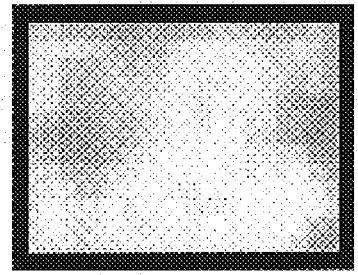
Figure 19I:
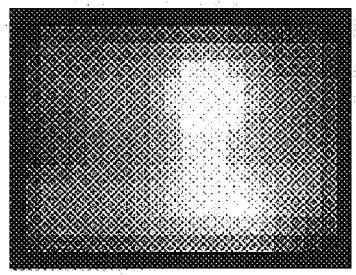
Figure 19J:
Figure 19K:
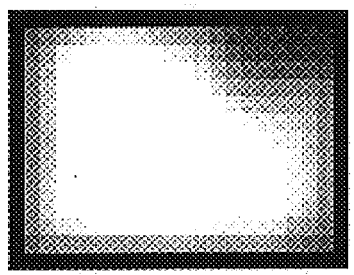
Figure 19L:
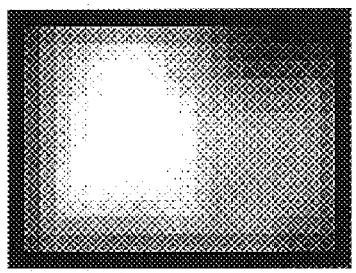
Figure 19M:
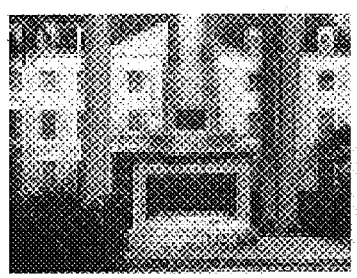
Figure 19N:
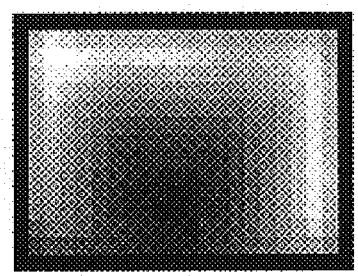
Figure 19O:
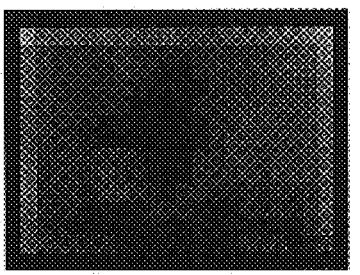

The first query involved a shot exhibiting a relatively placid scene with the camera motion being panning only. Referring to FIGS. 19A–C, a key frame of this pure panning-low motion shot is shown in FIG. 19A. A gray scale representation of the mixture energy computed for each macro block location is shown in FIG. 19B, and the PMES image of the shot is shown in FIG. 19C. It is noted that in general the first column of FIGS. 19A–O are key frames of a query shot, while the second column shows the mixture energy images and the third column shows the PMES images derived from the shots. Pure panning has very high mixture energy, but its PMES is much lower, because there isn't much object related motion. The second query involved a shot again having a pure panning camera motion, but this time with small active objects in the scene (i.e., the players on the field seen in the key frame of FIG. 19D) In this case, the mixture energy image of FIG. 19E is similar that of FIG. 19B even though there are moving objects in the second query shot. This is because the camera motion predominates. However, the PMES image of FIG. 19F is somewhat lighter than that of FIG. 19C owing to the moving objects. The third through fifth queries involved shots of an active object which the camera tracked. The key frame of one of these queries is shown in FIG. 19G, with the associated mixture energy and PMES images being shown in FIGS. 19H and I, respectively. It is very difficult to discriminate a tracking shot from a panning shot using mixture energy images as can be seen by comparing FIG. 19H with either FIG. 19B or 19E. However, the salient object motion in a tracking shot is presented very distinctly in the PMES image. The sixth query involved a shot depicting a very active object (i.e., the golfer shown in the key frame of FIG. 19J) with the camera zooming in on the object. This type of shot will always exhibit a very bright mixture energy image, as can be seen in FIG. 19K. However, the associated PMES image (see FIG. 19L) is light only in the salient object motion region. The seventh query involved a shot of a relatively inactive scene with pure camera zooming. The key frame of this shot is shown in FIG. 19M. Pure zooming produces the mixture energy image of FIG. 19N. It exhibits lighter regions, which depict areas of higher mixture energy, in the region far from the Focus of Expansion (FOE)/Focus of Contraction (FOC). However, since there isn't any appreciable salient object motion, the PMES is very dark. The eighth query, which is not represented in FIGS. 19A–O, involves an object exhibiting slight motion, such as an anchorperson in a newscast, and very little camera motion. Both the mixture energy and PMES images associated with this shot are very dark. However, a specific PMES distribution can be used for discriminating the object from other slight motions.

The experiments compared the performance of using mixture energy images with the use of PMES images associated with the above-described query shots in a motion-based shot retrieval application. The results are provided in the Table shown in FIG. 18. The average normalized modified retrieval rank, ANMRR, recommended by MPEG-7 standardization, was adopted as the evaluation criteria for the comparison. Given a query set and the corresponding ground truth data, the ANMRR value ranges between [0,1]. A low value denotes a high retrieval rate with relevant items ranked at the top.

Let the number of ground truth shots for query q be NG(q). Let K=min(4×NG(q), 2×GTM), where GTM is max(NG(q)) for all queries. For each ground truth shot k retrieved in the top K retrievals, the rank of the shot, Rank(k), was computed. The rank of the first retrieved item is counted as 1 and a rank of (K+1) is assigned to those ground truth shots not in the top K retrievals. The modified retrieval rank MRR(q) is computed as:

$$MRR(q) = \sum_{k=1}^{NG(q)} \frac{\text{Rank}(k)}{NG(q)} - \frac{1+NG(q)}{2} \tag{24}$$

Given Eq.(24), the normalized modified retrieval rank, NMRR, is defined as:

$$NMRR(q) = \frac{MRR(q)}{K - NG(q)/2 + 0.5} \tag{25}$$

where the value of NMRR is in the range of [0,1]. Finally, the average NMRR of all values is computed over all queries to yield the ANMRR.

The experimental results indicate that PMES based matching always outperforms mixture energy based methods, when one or more objects' motion exist in the shot. The motion in camera tracking is most complex because both the object motion and camera motion are all intensive. However, they are still discriminated effectively.

6.2. MVAE Based Shot Retrieval

Figure 20A:
FIGS. 20A–C are images showing a key-frame of a video shot (FIG. 20A), a MVAE image generated from the shot (FIG. 20B), and the MVAE image marked to show its hot blocks (FIG. 20C).
Figure 20B:
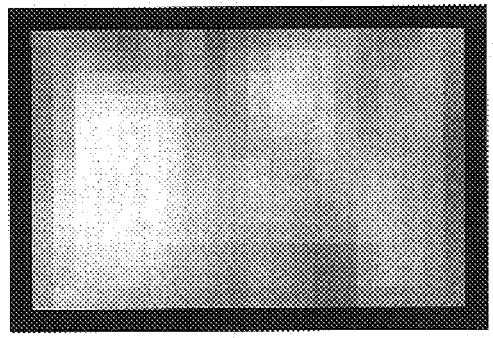
Figure 20C:
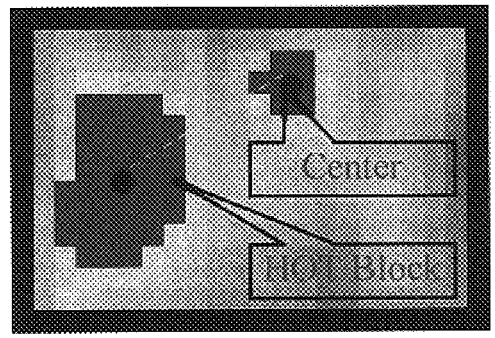

Another method of shot retrieval this time using MVAE images involves identifying regions of high energy representing the salient object motion in the images being compared. The regions will be referred to as Hot Blocks. The Hot Blocks can be found by simply identifying regions in the MVAE images having pixel gray level values exceeding a prescribed threshold level, where the threshold level is determined via any appropriate conventional method. FIGS. 20A–C provide an example of the Hot Block technique. FIG. 20A shows a key frame of a shot and FIG. 20B is a MVAE image derived from the shot. The thresholding procedure was used to find the Hot Blocks. These regions are marked in the MVAE image of FIG. 20C. Two MVAE images in which the locations of Hot Blocks have been identified can be compared by the Hot Block patterns. For example, the difference between the area and center of gravity of similarly located Hot Blocks between the images can be used as a measure of their similarity. In addition, the relationships between Hot Blocks in the MVAE images or the energy distribution within the Hot Blocks themselves (as evidence by the gray scale levels), can be compared between images as a measure of their similarity. Here again, those comparisons between the MVAE image input by the user and MVAE images in the database that exhibit a degree of similarity exceeding a prescribed threshold are reported to the user as described above.

It is also noted that the foregoing procedure could also be employed for shot retrieval using PMES images instead of MVAE images.

6.3. STE Based Shot Retrieval

Figure 21:
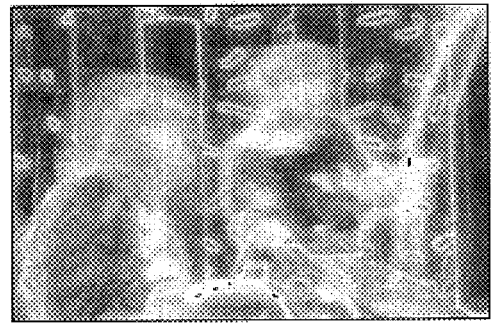
FIG. 21 is an image showing a STE image generated from the video shot associated with FIGS. 20A–C.

In a STE image, the contour and trail of motion of an object is recorded. In essence, a STE image describes the object's motion pattern or process along temporal axis. In addition, the spatial relationship and energy distribution of the object motions are described accurately in STE images. Thus, as can be seen in FIG. 21, a STE image depicts the motion of a shot in a manner in which the objects and background are discernable. Because of this conventional comparison techniques employed with normal images can be employed in a shot retrieval application using STE images. For example, the distinguishing features of a STE image can be extracted using a conventional gray scale or edge histogram (global or local), entropy, texture, and shape techniques, among others. The STE image submitted by a user is then compared to the STE images in the database and their degree of similarity access. The STE image or images in the database that exhibit a prescribed degree of similarity to the STE image input by the user are reported to the user as described above.

6.4. Shot Retrieval Using a Combination of PMES, STE AND MVAE Images

PMES, STE and MVAE images characterize video shots in a similar ways, but using different aspects of motion. For example, PMES and MVAE images provide a robust description for salient motion in shot at a highly abstracted level, with the PMES image being more specific in that it characterizes just the object motion, whereas a MVAE characterizes both object and camera motion. STE images, on the other hand, provide a more concrete description of the motion in a video shot in which the motion trail of object is discernable via its contour outline. As such, STE images can represent motion energy in more detail. Thus, PMES and MVAE images are more robust, while STE images provide more motion information. These distinctions can be exploited by using the various shot characterizing images in a hierarchical manner. For example, the salient motion regions of a shot input by a user in a retrieval query can be characterized using either a PMES or MVAE image and then the hot blocks can be identified. This is followed with the characterization of just the hot block regions of the shot using a STE image. Finally, a database containing STE characterized shots would be searched as described above to find matching video sequences. Alternately, the database containing PMES or MVAE images could be searched and candidate match video shots identified in a preliminary screening. These candidate shots are then characterized as STE images, as is the user input shot. The STE image associated with the user input shot is then compared to the STE images associated with the candidate shots to identify the final shots that are reported to the user.

It is noted that the database containing characterized images of video shots need not have just one type of characterizing shot. Rather, the same database could include shots characterized using PMES, STE or MVAE images. Further, the same shot could be represented in the database by more than one type of characterizing image. For example, the same shot could be represented by a PMES, STE and MVAE image. This would have particular advantage in the embodiment described above where candidate shots are identified using PMES or MVAE images and then re-screened using STE images, as the STE images of the candidate shots would already exist in the database.

7.0. Detecting Moving Objects Using STE Images

In addition to shot retrieval, another application particular to STE based shot characterization involves using STE images as a basis for a motion detection process. Motion detection has many uses particularly in connection with surveillance of a scene to detect the entrance of a person. STE images are particularly useful for this purpose as they essentially capture the contour and motion of any object moving in sequence of video frames.

Figure 22:
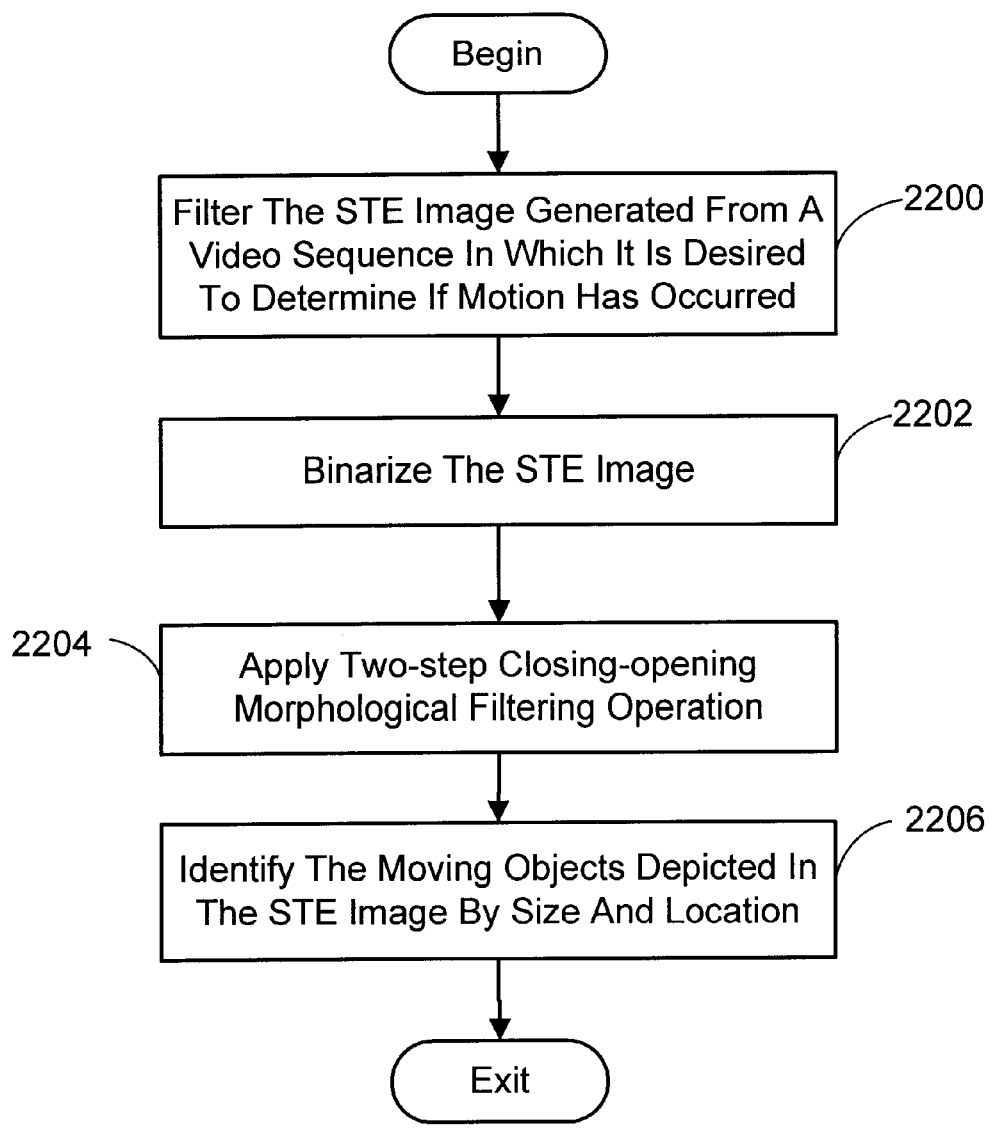
FIG. 22 is a flow chart diagramming a process for using STE images in a motion detection application.

One way to effect motion detection using STE images will now be described. Referring to FIG. 22, the motion detection process begins by filtering the STE image generated from a video sequence in which it is desired to determine if motion has occurred (process action 2200). The purpose of the filtering is to eliminate high frequency noise in the STE image that can cause a false indication of motion where none has occurred. In tested embodiments of the present motion detection process, a standard Gaussian filtering operation was performed to smooth the STE image and eliminate the high frequency noise. The smoothed STE image is next subjected to a two-part morphological filtering operation to consolidate regions of motion and to eliminate any extraneous region where the indication of motion is caused by noise. In order to accomplish the morphological filtering the STE image is first binarized (process action 2202). Specifically, this is done using an adaptive threshold T defined as follows:

$$T = \mu_\Phi + \alpha \sigma_\Phi \qquad (26)$$

where $\mu_\Phi$ is the mean of energy flux $\Phi$, $\sigma_\Phi$ is the standard deviation of energy flux $\Phi$, and $\alpha$ is a consistent coefficient, which can be assigned a value between 1 and 3. Those pixels of the STE whose gray level equals or exceeds T are set to the first binary color (which will be assumed to be white for the purposes of this description) and those whose gray levels fall below T are set to the second binary color (which will be assumed to be black for the purposes of this description).

Once the smoothed STE image has been binarized, a two-step closing-opening morphological filtering operation is employed (process action 2204). Specifically, in the first part of the filtering, a standard closing procedure is performed in which the motion regions in the image are first dilated by changing boundary pixels outside the motion regions to white, and then eroded by changing the boundary pixels inside the motion regions to black. The purpose of this part of the morphological filtering operation is to close any discontinuities in the motion regions depicting a single moving object. The second part of the filtering operation is a standard opening procedure. In this case the boundary pixels inside each motion region are first eroded as described above, and then dilated. The purpose of this part of the procedure is to separate motion regions belonging to different moving objects and to eliminate extraneous motion regions. Finally, the moving objects depicted in the STE image are identified by their size and location (process action 2206). This is preferably accomplished using a standard region growing technique to establish the size of each motion region, and then defining the position of each motion region using a boundary box.

FIGS. 4A, C and D illustrate foregoing object motion detection process. FIG. 4A is a frame of the video sequence which recorded a man with a briefcase walking down a hallway. The video sequence was used to generate the STE image shown in FIG. 4D. This STE image was then subjected to the foregoing motion detection process. FIG. 4C is an image illustrating the results of the motion detection process where the motion region corresponding to the man is shown in white. In addition, a bounding box is shown encompassing the motion region. A identical bounding box is also included in the frame shown in FIG. 4A from the original video sequence. Notice that the bounding box encompasses the walking man.

FIG. 4B is an image representing the difference between two consecutive frames of the aforementioned video sequence, in which only currently moving edges are presented. Note that the complete shape of the moving object cannot be readily discerned, and that the motion object does not form a continuous region. An accumulated difference image of this type might provide more motion information, but the errors and noise are also accumulated. Although there is typically some noise in a STE image resulting from variations in the illumination of the scene during the time the original video sequence was captured (see FIG. 4D as an example), this noise does not accumulate. As FIG. 4D shows, the moving object is detected with accurate edge, shape and position.

It is noted that in many surveillance-type applications, it is required that the motion detection process be nearly real-time. This is possible using the present STE image based motion detection process. Granted, generating a STE image requires a number of frames to be processed to produce a properly exposed image. However, a sliding window approach can be taken. Essentially, this involves an initialization period in which a first STE image is generated from the initial frames of the video, which can be a "live" surveillance video. Once the first STE image is generated, subsequent STE images can be generated by simply dropping the pixel data associated with the first frame of the previously considered frame sequence and adding the pixel data from the next received frame of the video.

Figure 23A:
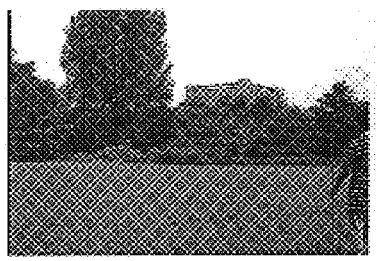
FIGS. 23A–L are images illustrating the results using STE images to characterize a set of 5 video shots in a motion detection application as outlined in FIG. 22, where the first column shows a frame of a video shot, the second column shows the associated STE image generated from the video shot, and the last column shows a motion detection results image.
Figure 23B:
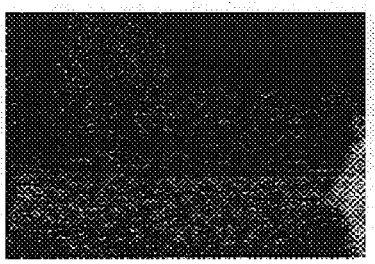
Figure 23C:
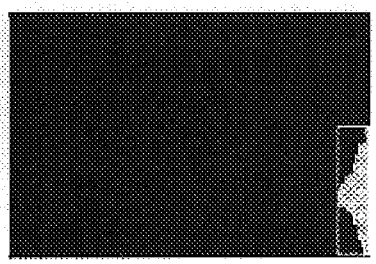
Figure 23D:
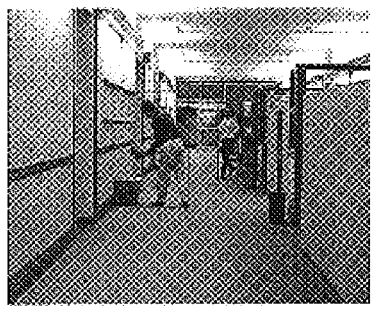
Figure 23E:
Figure 23F:
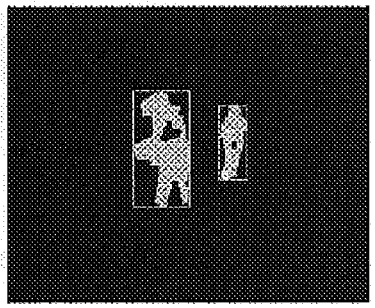
Figure 23G:
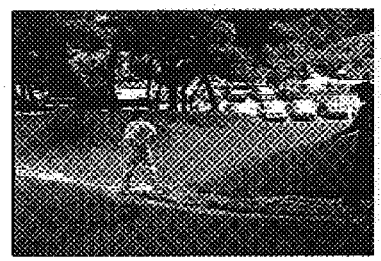
Figure 23H:
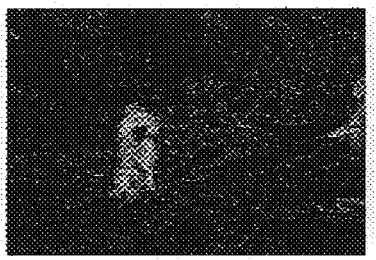
Figure 23I:
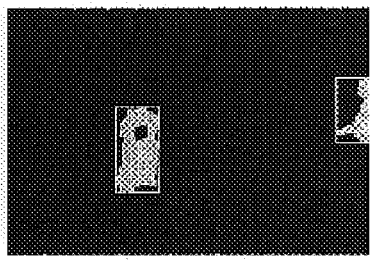
Figure 23J:
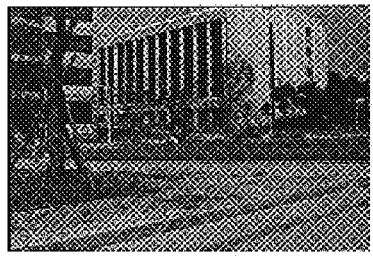
Figure 23K:
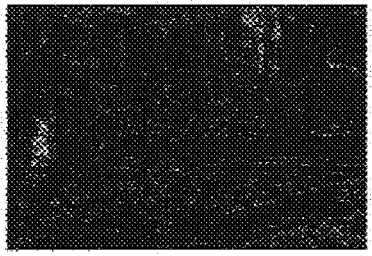
Figure 23L:
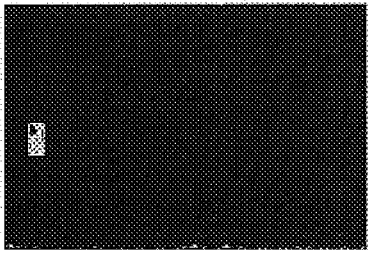

The foregoing STE image-based object motion detection scheme employing the sliding window technique was tested on video clips in a MPEG-7 data set and a MPEG-4 test sequence. A total of 4 video clips were selected. A sliding window was employed so that moving objects are detected with each new frame. FIGS. 23A–L provide images exemplifying the results of the testing. The first column (i.e., FIGS. 23A, D, G and J) each show a randomly selected frame from a corresponding video clip. The second column (i.e., FIGS. 23B, E, H and K) shows the STE image generated from the four clips. And finally, the last column (i.e., FIGS. 23C, F, I and L) shows the detection results. In FIG. 23A, an intruder is seen entering the monitored scene. When a part of his body appears, the present system captures him accurately in time, as indicated by the motion detection image of FIG. 23C. There are two moving objects in monitored scene depicted in FIG. 23D. One is a person walking away from the camera, and the other is a person walking toward the camera. In addition, the former person has a special action: putting a briefcase on a box. These individuals were detected by the present system until they disappeared from the scene, as evidenced by the motion detection image of FIG. 23F. Although the illumination is very complex in the scene depicted in FIG. 23G, including light and dark regions, the moving objects are readily detected both in the light region and the dark region, as can be seen in the motion detection image of FIG. 23I. In FIG. 23J, it can be seen that the moving object is very small, and the lighting is very weak. Moreover, the target is moving behind some trunks. However, as evidenced by the motion detection image of FIG. 23L, the person moving in the scene is still detected. The foregoing experimental results show that the STE-based motion detection method is effective and robust.

While the invention has been described in detail by specific reference to preferred embodiments thereof, it is understood that variations and modifications thereof may be made without departing from the true spirit and scope of the invention. For example, while the PMES, MVAE and STE images were described as gray level images, this need not be the case. In general, the intensity of motion depicted over the video sequence in a frame region of the sequence can be characterized in a PMES, MVAE or STE image using the intensity or color level of the pixels residing in that region. Thus, the PMES, MVAE or STE image could be a color image, and the relative motion intensity could be indicated by the brightness or the color of a pixel.

Wherefore, what is claimed is:

1. A computer-implemented process for characterizing a sequence of video frames, comprising using a computer to perform the following process actions:

deriving from the sequence of video frames a separate value indicative of the intensity of the motion depicted over the sequence in each of a plurality of frame regions, said deriving comprising, (a) inputting the next frame in the sequence that has not been input before, (b) extracting and storing motion vector data from the last-input frame, (c) computing a motion energy flux that takes into account all the motion vector data of all the inputted frames, (d) determining whether the motion energy flux exceeds a prescribed flux threshold, (e) whenever the motion energy flux does not exceed the threshold, determining whether there are any remaining previously un-inputted frames of the sequence containing motion vector information, whenever there are such remaining frames, repeating process actions (a) through (e), (f) whenever the flux threshold is exceeded by the motion energy flux, or whenever there are no remaining previously un-inputted frames of the sequence containing motion vector information, computing a mixture energy value for each of the prescribed frame regions, said mixture energy reflecting both object motion and camera motion components of the motion intensity, and (g) removing the camera motion component associated with each mixture energy value, thereby leaving just the object motion portion of the mixture energy value, to produce a perceived motion energy (PME) value for each frame region which represents said value indicative of the intensity of the motion in the region; and generating an image wherein each pixel of the image has a level reflecting the value indicating the intensity of motion, relative to all such values, associated with the region containing the corresponding pixel location.

2. The process of claim 1, further comprising a process action of discarding those motion vectors having magnitudes that are atypically large which is performed prior to performing the process action of computing the motion energy flux.

3. The process of claim 1, wherein the process action of computing the motion energy flux, comprises the actions of:

computing the average motion vector magnitude for all the frame regions in each of the inputted frames;

computing a value representing the average variation of the vector angle associated with the motion vectors of every frame region in each of the frames;

multiplying the average magnitude by a first prescribed weighting factor;

multiplying the average angle variation by a second prescribed weighting factor;

summing the product of the average magnitude and the first prescribed weighting factor with the product of the average angle variation and the second prescribed weighting factor to produce a motion intensity coefficient; and multiplying the motion intensity coefficient by a normalizing constant, the area of a tracking window and the number of frames input, to produce the motion energy flux.

4. The process of claim 1, wherein the process action of computing a mixture energy value for each of the prescribed frame regions, comprises, for each frame region, the actions of:

sorting the motion vectors associated with the frame regions residing in a tracking volume defined by a tracking window centered on the frame region under consideration and the sequence of inputted frames, in descending order of their magnitude values;

discarding a prescribed number of the sorted motion vectors having magnitude values at the high and low ends of the magnitude range of the sorted vectors;

averaging the magnitude values of the remaining, non-discarded motion vectors;

dividing the averaged magnitude values by the area of the tracking window area and the number of inputted frames and a prescribed truncating threshold to produce a candidate mixture energy value for the frame region under consideration;

determining whether the candidate mixture energy value is less than or equal to 1;

whenever the candidate mixture energy value is less than or equal to 1, assigning the candidate value as the mixture energy value for the frame region under consideration; and whenever the candidate mixture energy value is greater than 1, assigning a value of 1 as the mixture energy value for the frame region under consideration.

5. The process of claim 4, wherein the process action of removing the camera motion component associated with each mixture energy value to produce a PME value for each frame region, comprises, for each frame region, the actions of:

creating a motion vector angle histogram by assigning to each of a set of angle range bins, the number of the remaining, non-discarded vector angles associated with the frame regions residing within the tracking volume that fall into that bin;

normalizing the motion vector angle histogram by respectively dividing the total number of motion vector angles falling into each bin by the sum of the number of angles falling into all the bins;

respectively multiplying each normalized angle histogram bin value by the logarithm of that value, summing the resulting products and designating the negative value of the sum as the angle entropy value for the frame region under consideration;

dividing the angle entropy value by the logarithm of the total number of bins in the motion vector angle histogram to produce a normalized angle entropy value representing a global motion ratio; and multiplying the global motion ratio by the normalized mixed energy value associated with the frame region under consideration to produce the PME value for that frame region.

6. The process of claim 1, wherein the process action of generating the image, comprises the actions of:

quantizing the PME values computed for each of frame region to 256 gray levels;

assigning the gray level corresponding to each PME value to its associated frame region to create a perceived motion energy spectrum (PMES) image.

7. A computer-implemented process for characterizing a sequence of video frames, comprising using a computer to perform the following process actions:

deriving from the sequence of video frames comprising pixel color data, a separate value indicative of the intensity of the motion depicted over the sequence in each of a plurality of frame regions, said deriving comprising, (a) inputting the next frame in the sequence that has not been input before, (b) extracting and storing pixel color data from the last-inputted frame, (c) computing a motion energy flux that takes into account all the pixel color data of all the inputted frames, (d) determining whether the motion energy flux exceeds a prescribed flux threshold, (e) whenever the motion energy flux does not exceed the threshold, determining whether there are any remaining previously un-inputted frames of the sequence, whenever there are such remaining frames, repeating process actions (a) through (e), (f) whenever the flux threshold is exceeded by the motion energy flux, or whenever there are no remaining previously un-inputted frames of the sequence, computing a spatio-temporal energy (STE) value for each pixel location; and generating an image wherein each pixel of the image has a level reflecting the value indicating the intensity of motion, relative to all such values, associated with the region containing the corresponding pixel location.

8. The process of claim 7, wherein the frames of the video sequence are encoded, and wherein the process action of extracting and storing pixel color data, comprises an action of decoding the last-inputted frame.

9. The process of claim 7, wherein the process action of computing the motion energy flux, comprises the actions of:
   computing a value representing the average variation in the pixel color levels of every pixel in each of the inputted frames;
   multiplying the average pixel color level variation by the reciprocal of the maximum color variation observed in the pixel color levels among every pixel in each of the inputted frames to produce a motion intensity coefficient; and
   multiplying the motion intensity coefficient by a normalizing constant, the area of a tracking window and the number of frames input, to produce the motion energy flux.

10. The process of claim 7, wherein the process action of computing a STE value for each pixel location, comprises, for each pixel location, the actions of:
    creating a temporal color histogram by assigning to each of a set of color space range bins, the number of pixels residing within a tracking volume defined by a tracking window centered on the pixel location under consideration and the sequence of inputted frames, which fall into that bin;
    normalizing the temporal color histogram by respectively dividing the total number of pixels whose color levels fall into each bin by the sum of the number of pixels whose color levels fall into all the bins;
    respectively multiplying each normalized temporal color histogram bin value by the logarithm of that value, summing the resulting products and designating the negative value of the sum as the STE value fro the pixel location under consideration.

11. The process of claim 7, wherein the process action of generating the image, comprises the actions of:
    quantizing the STE values computed for each of frame region to 256 gray levels;
    assigning the gray level corresponding to each STE value to its associated frame region to create a STE image.

12. A computer-implemented process for characterizing a sequence of video frames, comprising using a computer to perform the following process actions:
    deriving from the sequence of video frames a separate value indicative of the intensity of the motion depicted over the sequence in each of a plurality of frame regions, said deriving comprising,
    (a) inputting the next frame in the sequence that has not been input before,
    (b) extracting and storing motion vector data from the last-input frame,
    (c) computing a motion energy flux that takes into account all the motion vector data of all the inputted frames,
    (d) determining whether the motion energy flux exceeds a prescribed flux threshold,
    (e) whenever the motion energy flux does not exceed the threshold, determining whether there are any remaining previously un-inputted frames of the sequence containing motion vector information, whenever there are such remaining frames, repeating process actions (a) through (e),
    (f) whenever the flux threshold is exceeded by the motion energy flux, or whenever there are no remaining previously un-inputted frames of the sequence containing motion vector information, computing a motion vector angle energy (MVAE) value for each frame region; and
    generating an image wherein each pixel of the image has a level reflecting the value indicating the intensity of motion, relative to all such values, associated with the region containing the corresponding pixel location.

13. The process of claim 12, wherein the process action of computing the motion energy flux, comprises the actions of:
    computing the average motion vector magnitude for all the frame regions in each of the inputted frames;
    computing a value representing the average variation of the vector angle associated with the motion vectors of every frame region in each of the frames;
    multiplying the average magnitude by a first prescribed weighting factor;
    multiplying the average angle variation by a second prescribed weighting factor;
    summing the product of the average magnitude and the first prescribed weighting factor with the product of the average angle variation and the second prescribed weighting factor to produce a motion intensity coefficient; and
    multiplying the motion intensity coefficient by a normalizing constant, the area of a tracking window and the number of frames input, to produce the motion energy flux.

14. The process of claim 12, wherein the process action of computing a motion vector angle energy value for each frame region location, comprises, for each frame region, the actions of:
    creating a motion vector angle histogram by assigning to each of a set of angle range bins, the number of motion vector angles associated with the frame regions residing within the tracking volume defined by a tracking window centered on the frame location under consideration and the sequence of inputted frames, which fall into that bin;
    normalizing the motion vector angle histogram by respectively dividing the total number of motion vector angles falling into each bin by the sum of the number of angles falling into all the bins; and
    respectively multiplying each normalized angle histogram bin value by the logarithm of that value, summing the resulting products and designating the negative value of the sum as the MVAE value for the frame region under consideration.

15. The process of claim 12, wherein the process action of generating the image, comprises the actions of:
    quantizing the MVAE values computed for each of frame region to 256 gray levels;
    assigning the gray level corresponding to each MVAE value to its associated frame region to create a MVAE image.

16. A system for finding one or more video shots in a database, each of which comprises a sequence of video frames which depict motion similar to that specified by a user in a user query, comprising:
    a general purpose computing device;
    the database which is accessible by the computing device and which comprises,
    a plurality of characterizing images each of which represents a shot, wherein each characterizing image is an image comprising pixels reflecting the intensity of motion associated with a corresponding region in the sequence of video frames;

a computer program comprising program modules executable by the computing device, wherein the computing device is directed by the program modules of the computer program to, input the user query which comprises a characterizing image that characterizes motion in the same manner as at least some of the characterizing images contained in the database, and compare the user query image to characterizing images contained in the database that characterize motion in the same manner as the user query image to find characterizing images that exhibit a degree of similarity equaling or exceeding a prescribed minimum similarity threshold, said comparing sub-module comprising, segmenting the user query image, and each of the characterizing images to which the user query image is to be compared, into m×n panes, constructing a normalized energy histogram with m×n bins for the user query image and each of the characterizing images to which the user query image is to be compared, normalizing each energy histogram, and assessing the degree of similarity between the user query image and each of the characterizing images to which the user query image is to be compared, said assessing sub-module comprising for each pair of characterizing images compared, identifying the minimum bin value for each corresponding bin of the energy histograms associated with the pair of characterizing images being compared, summing the identified minimum bin values, identifying the maximum bin value for each corresponding bin of the energy histograms associated with the pair of characterizing images being compared, summing the identified maximum bin values, dividing the sum of the minimum bin values by the sum of the maximum bin values to produce the a similarity value indicative of the degree of similarity between the pair of characterizing images being compared.

17. The system of claim 16, wherein the sub-module for constructing a normalized energy histogram, comprises, for each characterizing image involved, sub-modules for:

averaging the pixel values residing within in each pane of the characterizing image; and assigning to each of the histogram bins, the number of averaged values that fall into the value range associated with that bin.

18. The system of claim 17, wherein the sub-module for normalizing each energy histogram, comprises sub-modules for:

respectively dividing the total number of averaged pixel values falling into each bin by the sum of the number of such values falling into all the bins.

19. The system of claim 16, wherein the sub-modules for segmenting each of the characterizing images to which the user query image is to be compared, constructing a normalized energy histogram for each of the characterizing images to which the user query image is to be compared, and normalizing the energy histogram associated with each of the characterizing images to which the user query image is to be compared, are executed before the user query image is input and are made accessible through the database.

20. A system for finding one or more video shots in a database, each of which comprises a sequence of video frames which depict motion similar to that specified by a user in a user query, comprising:

a general purpose computing device;

the database which is accessible by the computing device and which comprises, a plurality of characterizing images each of which represents a shot, wherein each characterizing image is an image comprising pixels reflecting the intensity of motion associated with a corresponding region in the sequence of video frames;

a computer program comprising program modules executable by the computing device, wherein the computing device is directed by the program modules of the computer program to, input the user query which comprises a characterizing image that characterizes motion in the same manner as at least some of the characterizing images contained in the database, and compare the user query image to characterizing images contained in the database that characterize motion in the same manner as the user query image to find characterizing images that exhibit a degree of similarity equaling or exceeding a prescribed minimum similarity threshold, said comparing sub-module comprising, identifying regions of high energy in the user query image, and each of the characterizing images to which the user query image is to be compared, and assessing the degree of similarity between the user query image and each of the characterizing images to which the user query image is to be compared based on a comparison of at least one of (i) the size, (ii) shape, (iii) location, and (iv) energy distribution of the identified high energy regions between the pair of characterizing images being compared to produce the a similarity value indicative of the degree of similarity between each pair of characterizing images compared.

21. The system of claim 20, wherein the sub-module for identifying regions of high energy in each of the characterizing images to which the user query image is to be compared, is executed before the user query image is input and are made accessible through the database.

22. A system for detecting motion in a scene as depicted in a sequence of video frames of the scene, comprising:

a general purpose computing device; and a computer program comprising program modules executable by the computing device, wherein the computing device is directed by the program modules of the computer program to, derive from the sequence of video frames a separate value indicative of the intensity of the motion depicted over the sequence at each pixel location associated with the frames, generate a gray scale image having the same resolution as the video frames, wherein each pixel of the gray scale image has a gray scale level reflecting a value indicating the intensity of motion, relative to all such values, depicted over the sequence at each pixel location associated with the frames, filter the gray scale image to reduce high frequency noise, subject the filtered gray scale image to a morphological closing operation followed by a morphological opening operation to respectively consolidate regions of motion in the gray scale image and to eliminate any extraneous region where an indication of motion is caused by noise, and provide information that motion has been detected in the shot under consideration whenever a region of motion remains in the filtered and morphologically operated image.

23. The system of claim 22, wherein the program module for filtering the gray scale image, comprises a sub-module for filtering the gray scale image using a Gaussian filtering operation.

24. The system of claim 22, further comprising program modules for:

subjecting the filtered and morphologically operated gray scale image to a region growing operation to establish a size for each region of motion depicted in the image, identifying the location of each region of motion using a separate bounding box for each region, wherein each bounding box encompasses its associated region of motion.

25. The system of claim 24, wherein the program module for providing information that motion has been detected in the shot under consideration, comprises a sub-module for providing to a user a frame of the video sequence which depicts an object corresponding to at least one of the regions of motion, wherein the bounding box associated with the at least one region of motion is superimposed on the frame to highlight the location of the object whose motion was detected.

26. The system of claim 22, wherein the sequence of frames is part of a continuous video monitoring the scene and represents the frames within a sliding temporal window which adds each new frame generated and simultaneously deletes the oldest frame each time a new frame is added to create a new sequence of frames, and wherein the program modules of the computer program are executed each time a new sequence of frames is created.

27. A system for finding one or more video shots in a database, each of which comprises a sequence of video frames which depict motion similar to that specified by a user in a user query, comprising:

a general purpose computing device;

the database which is accessible by the computing device and which comprises, a plurality of characterizing images each of which represents a shot, wherein each characterizing image is a gray scale image comprising pixels which each have a gray scale level reflecting the intensity of motion associated with a corresponding region in the sequence of video frames;

a computer program comprising program modules executable by the computing device, wherein the computing device is directed by the program modules of the computer program to, input the user query which comprises a first type of said characterizing images representing a video shot and the video shot itself, identify regions of high energy in the user query image, generate a new characterizing image from just those portions of the frames of the user input video shot corresponding to the identified regions of high energy in the user query image, wherein the new characterizing image of a second type of said characterizing images, compare the new characterizing image to characterizing images contained in the database that are also the second type of said characterizing images to find characterizing images that exhibit a degree of similarity equaling or exceeding a prescribed minimum similarity threshold, and provide information for accessing the shot corresponding to at least one of any characterizing images contained in the database that were found to exhibit a degree of similarity equaling or exceeding the prescribed minimum similarity threshold.

28. A system for finding one or more video shots in a database, each of which comprises a sequence of video frames which depict motion similar to that specified by a user in a user query, comprising:

a general purpose computing device;

the database which is accessible by the computing device and which comprises, a plurality of characterizing images each of which represents a shot, wherein each characterizing image is an image comprising pixels which each have a level reflecting the intensity of motion associated with a corresponding region in the sequence of video frames;

a computer program comprising program modules executable by the computing device, wherein the computing device is directed by the program modules of the computer program to, input the user query which comprises a first type of said characterizing images and which characterizes motion in the same manner as at least some of the characterizing images contained in the database, input a video shot from which the user query image was generated, compare the user query image to characterizing images contained in the database that characterize motion in the same manner as the user query image to find characterizing images that exhibit a degree of similarity equaling or exceeding a prescribed minimum similarity threshold associated with the first type of characterizing images, generate a new characterizing image from the user input video shot, wherein the new characterizing image of a second type of said characterizing images, respectively generate a characterizing image of the second type from each of the video shots associated with the characterizing images of the first type that exhibited a degree of similarity equaling or exceeding the prescribed minimum similarity threshold, compare the new characterizing image to the characterizing images generated from each of the video shots associated with the characterizing images of the first type that exhibited a degree of similarity equaling or exceeding the prescribed minimum similarity threshold associated with the first type of characterizing images, to find which of the images exhibit a degree of similarity equaling or exceeding the prescribed minimum similarity threshold associated with the second type of characterizing images, and provide information for accessing the shot corresponding to at least one of any the characterizing images of the second type that were found to exhibit a degree of similarity equaling or exceeding the prescribed minimum similarity threshold associated with the second type of characterizing images.

29. The system of claim 28, wherein the program module for respectively generating a characterizing image of the second type from each of the video shots associated with the characterizing images of the first type that exhibited a degree of similarity equaling or exceeding the prescribed minimum similarity threshold, is accomplished before the user query image is input by generating a characterizing image of the second type from the video shots associated with every characterizing image of the first type in the database.

30. A computer-readable medium having computer-executable instructions for characterizing at least a portion of a shot that is made up of a sequence of video frames at least some of which comprise motion vector data, said computer-executable instructions comprising:
- deriving from the sequence of video frames a separate value indicative of the intensity of the motion depicted over the sequence in each of a plurality of frame regions, said deriving comprising,
  - inputting a prescribed number of frames, which comprise motion vector data, in shot sequence order,
  - extracting and storing the motion vector data from the inputted frames,
  - discarding those motion vectors having magnitudes that are atypically large,
  - computing a mixture energy value for each of the prescribed frame regions, said mixture energy reflecting both object motion and camera motion components of the motion intensity, and
  - removing the camera motion component associated with each mixture energy value, thereby leaving just the object motion portion of the mixture energy value, to produce a perceived motion energy (PME) value for each frame region which represents said value indicative of the intensity of the motion in the region; and
- generating a gray scale image comprising pixels which each have a gray scale level reflecting the intensity of motion associated with a corresponding region in the sequence of video.

31. A computer-readable medium having computer-executable instructions for characterizing at least a portion of a shot that is made up of a sequence of video frames which comprise pixel pray level data, said computer-executable instructions comprising:
- deriving from the sequence of video frames a separate value indicative of the intensity of the motion depicted over the sequence in each of a plurality of frame regions, said deriving comprising,
  - (a) inputting the next frame in the sequence that has not been input before,
  - (b) extracting and storing pixel gray level data from the last-inputted frame,
  - (c) computing a motion energy flux that takes into account all the pixel gray level data of all the inputted frames,
  - (d) determining whether the motion energy flux exceeds a prescribed flux threshold,
  - (e) whenever the motion energy flux does not exceed the threshold, determining whether there are any remaining previously un-inputted frames of the shot, whenever there are such remaining frames, repeating process actions (a) through (e), and
  - (f) whenever the flux threshold is exceeded by the motion energy flux, or whenever there are no remaining previously un-inputted frames of the shot, computing a spatio-temporal energy (STE) value for each pixel location; and
- generating a gray scale image comprising pixels which each have a gray scale level reflecting the intensity of motion associated with a corresponding region in the sequence of video.

32. The computer-readable medium of claim 31, wherein the frames of the shot are encoded, and wherein the instruction for extracting and storing pixel gray level data, comprises a sub-module for decoding the last-inputted frame.

33. The computer-readable medium of claim 31, wherein the instruction for computing the motion energy flux, comprises sub-modules for:
- computing a value representing the average variation in the pixel gray level values of every pixel in each of the inputted frames;
- multiplying the average pixel gray level value variation by a prescribed gray level variation weighting factor to produce a motion intensity coefficient; and
- multiplying the motion intensity coefficient by a normalizing constant, the area of a tracking window and the number of frames input, to produce the motion energy flux.

34. The computer-readable medium of claim 31, wherein the instruction for computing a STE value for each pixel location, comprises, for each pixel location, sub-modules for:
- creating a temporal gray level histogram by assigning to each of a set of gray level range bins, the number of pixels residing within a tracking volume defined by a tracking window centered on the pixel location under consideration and the sequence of inputted frames, which fall into that bin;
- normalizing the temporal gray level histogram by respectively dividing the total number of pixels whose gray level values fall into each bin by the sum of the number of pixels whose gray level values fall into all the bins;
- respectively multiplying each normalized temporal gray level histogram bin value by the logarithm of that value, summing the resulting products and designating the negative value of the sum as the STE value for the pixel location under consideration.

35. The computer-readable medium of claim 31, wherein the instruction for generating the gray scale image, comprises sub-modules for:
- quantizing the STE values computed for each of frame region to 256 gray levels;
- assigning the gray level corresponding to each STE value to its associated frame region to create a STE image.

* * * * *

UNITED STATES PATENT AND TRADEMARK OFFICE
CERTIFICATE OF CORRECTION

| | | |
|---|---|---|
| PATENT NO. | : 6,965,645 B2 | |
| APPLICATION NO. | : 09/963164 | |
| DATED | : November 15, 2005 | |
| INVENTOR(S) | : Hong-Jiang Zhang et al. | |

It is certified that error appears in the above-identified patent and that said Letters Patent is hereby corrected as shown below:

In column 3, line 54, delete "a typically" and insert -- atypically --, therefor.

In column 8, line 64, after "of" insert -- ) --.

In column 11, line 20, delete "a typically" and insert -- atypically --, therefor.

In column 15, line 51, delete "a typical" and insert -- atypical --, therefor.

In column 16, line 5, delete "a typical" and insert -- atypical --, therefor.

In column 17, line 40, delete "$GMR_{ij}$," and insert -- $GMR_{I,J}$ --, therefor.

In column 20, line 62, delete "I" and insert -- 1 --, therefor.

In column 22, line 32, delete "I" and insert -- 1 --, therefor.

In column 22, line 40, delete "I" and insert -- 1 --, therefor.

In column 22, line 43, delete "I" and insert -- 1 --, therefor.

In column 22, line 45, delete "I" and insert -- 1 --, therefor.

In column 22, line 66, delete "I" and insert -- 1 --, therefor.

In column 23, line 13, delete "I" and insert -- 1 --, therefor.

In column 23, line 19, delete "I" and insert -- 1 --, therefor.

In column 26, line 57, after "process" delete "30".

UNITED STATES PATENT AND TRADEMARK OFFICE
CERTIFICATE OF CORRECTION

PATENT NO. : 6,965,645 B2
APPLICATION NO. : 09/963164
DATED : November 15, 2005
INVENTOR(S) : Hong-Jiang Zhang et al.

It is certified that error appears in the above-identified patent and that said Letters Patent is hereby corrected as shown below:

In column 31, line 56, delete "AND" and insert -- And --, therefor.

In column 32, line 66, delete "Tare" and insert -- T are --, therefor.

In column 37, line 38, in Claim 10, delete "fro" and insert -- for --, therefor.

In column 43, line 44, in Claim 31, delete "pray" and insert -- gray --, therefor.

Signed and Sealed this

Twenty-first Day of July, 2009

JOHN DOLL
*Acting Director of the United States Patent and Trademark Office*

UNITED STATES PATENT AND TRADEMARK OFFICE
CERTIFICATE OF CORRECTION

PATENT NO. : 6,965,645 B2
APPLICATION NO. : 09/963164
DATED : November 15, 2005
INVENTOR(S) : Hong-Jiang Zhang et al.

It is certified that error appears in the above-identified patent and that said Letters Patent is hereby corrected as shown below:

In column 3, line 54, delete "a typically" and insert -- atypically --, therefor.

In column 8, line 64, after "of" insert -- ) --.

In column 11, line 20, delete "a typically" and insert -- atypically --, therefor.

In column 15, line 51, delete "a typical" and insert -- atypical --, therefor.

In column 16, line 5, delete "a typical" and insert -- atypical --, therefor.

In column 17, line 40, delete "$GMR_{ij}$," and insert -- $GMR_{I,J}$ --, therefor.

In column 20, line 62, delete "I" and insert -- 1 --, therefor.

In column 22, line 32, delete "I" and insert -- 1 --, therefor.

In column 22, line 40, delete "I" and insert -- 1 --, therefor.

In column 22, line 43, delete "I" and insert -- 1 --, therefor.

In column 22, line 45, delete "I" and insert -- 1 --, therefor.

In column 22, line 66, delete "I" and insert -- 1 --, therefor.

In column 23, line 13, delete "I" and insert -- 1 --, therefor.

In column 23, line 19, delete "I" and insert -- 1 --, therefor.

In column 26, line 57, after "process" delete "30".

UNITED STATES PATENT AND TRADEMARK OFFICE
CERTIFICATE OF CORRECTION

PATENT NO. : 6,965,645 B2
APPLICATION NO. : 09/963164
DATED : November 15, 2005
INVENTOR(S) : Hong-Jiang Zhang et al.

It is certified that error appears in the above-identified patent and that said Letters Patent is hereby corrected as shown below:

In column 31, line 56, delete "AND" and insert -- And --, therefor.

In column 32, line 66, delete "Tare" and insert -- T are --, therefor.

In column 37, line 38, in Claim 10, delete "fro" and insert -- for --, therefor.

In column 43, line 44, in Claim 31, delete "pray" and insert -- gray --, therefor.

This certificate supersedes the Certificate of Correction issued July 21, 2009.

Signed and Sealed this

Eighteenth Day of August, 2009

David J. Kappos
*Director of the United States Patent and Trademark Office*